(12) United States Patent
Moscovitch et al.

(10) Patent No.: US 6,343,006 B1
(45) Date of Patent: Jan. 29, 2002

(54) COMPUTER DISPLAY SCREEN SYSTEM AND ADJUSTABLE SCREEN MOUNT, AND SWINGING SCREENS THEREFOR

(76) Inventors: Jerry Moscovitch, 59 Cowar Avenue, Toronto, Ontario (CA), M6K 2N1; Mark D. Elchuk, 4845 Davis Ct., Troy, MI (US) 48098

( * ) Notice: Subject to any disclaimer, the term of this patent is extended or adjusted under 35 U.S.C. 154(b) by 0 days.

(21) Appl. No.: 09/444,188

(22) Filed: Nov. 19, 1999

Related U.S. Application Data

(60) Provisional application No. 60/109,668, filed on Nov. 20, 1998.

(51) Int. Cl.[7] .......................... H05K 5/00; G02F 1/1333
(52) U.S. Cl. ...................... 361/681; 361/682; 361/683; 348/794; 364/708.1
(58) Field of Search ................................. 361/681–683; 345/205; 248/917; 40/530; 348/794; 364/708.1

(56) References Cited

U.S. PATENT DOCUMENTS

| | | | |
|---|---|---|---|
| 4,112,423 A | | 9/1978 | Bertolasi |
| 4,159,417 A | | 6/1979 | Rubincam |
| D278,820 S | | 5/1985 | Woodhall |
| 5,122,941 A | * | 6/1992 | Gross et al. ................. 362/276 |
| 5,224,861 A | * | 7/1993 | Glass et al. .................... 434/35 |
| D340,235 S | | 10/1993 | Robak et al. |
| 5,467,102 A | | 11/1995 | Kuno et al. |
| 5,534,888 A | | 7/1996 | Lebby et al. |
| 5,673,170 A | | 9/1997 | Register |
| 5,687,939 A | * | 11/1997 | Moscovitch ............. 248/122.1 |
| 5,918,841 A | * | 7/1999 | Sweere et al. ......... 248/123.11 |
| 6,015,120 A | * | 1/2000 | Sweere et al. ......... 248/123.11 |
| 6,019,332 A | * | 2/2000 | Sweere et al. ............ 248/284.1 |
| 6,061,104 A | * | 5/2000 | Evanicky et al. ........... 348/827 |

FOREIGN PATENT DOCUMENTS

| | | | | |
|---|---|---|---|---|
| JP | 3-291722 A | * | 12/1991 | ............. G06F/3/14 |
| JP | 10-55165 A | * | 2/1998 | ............ G09G/3/20 |
| JP | 11-271730 A | * | 10/1999 | ......... G02F/1/1333 |

OTHER PUBLICATIONS

Brochure on "Galileo 1S" from Specialized Technology Group, dated Sep. 8, 1998.
Advertisement from Smart Glas, dated Sep. 8, 1998.

* cited by examiner

Primary Examiner—Leo P. Picard
Assistant Examiner—Anatoly Vortman
(74) Attorney, Agent, or Firm—Harness Dickey & Pierce P.L. C.

(57) ABSTRACT

A dual screen display system having, a base, a pair of electronic display screens, an arm assembly supporting the display screens and connected to the base, swingable mountings for swingably mounting the display screens, the mountings being adjustable as to the angular orientation of each of the display screens relative to the arm assembly between a first arrangement with the screens in a common plane, and a second arrangement in which the screens are inwardly swung positions thereby to permit each of the screens to be swung into desired operative angular orientation, and adjustable movement limiting devices, engaging the swinging mountings and limiting movement of the screens. Also disclosed are interchangeable mounting brackets for mounting screens of varying sizes, or for mounting screens in various configurations, and hingeable and rotatable support members for supporting the screens so the screens are swingable to face in opposite directions. A modular display system is also disclosed which allows a one, two three or four display panel system to be formed.

4 Claims, 26 Drawing Sheets

FIG 4
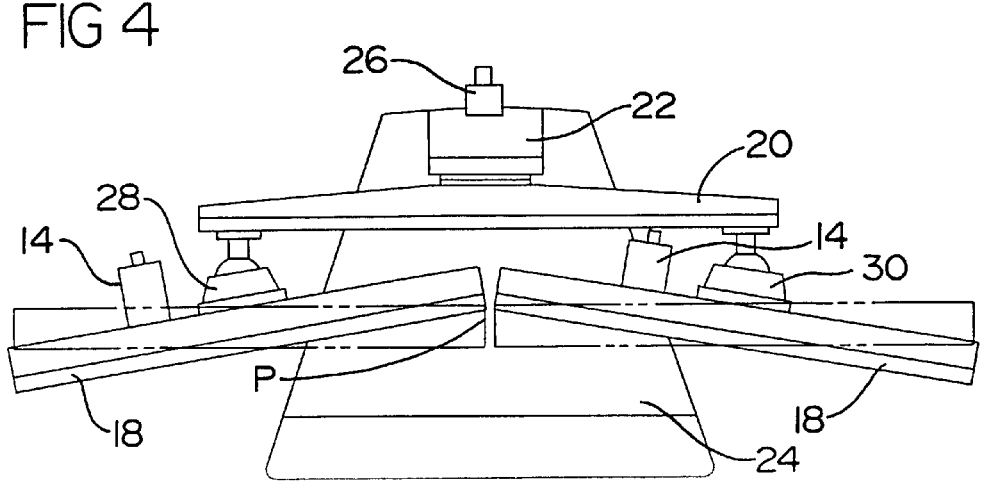
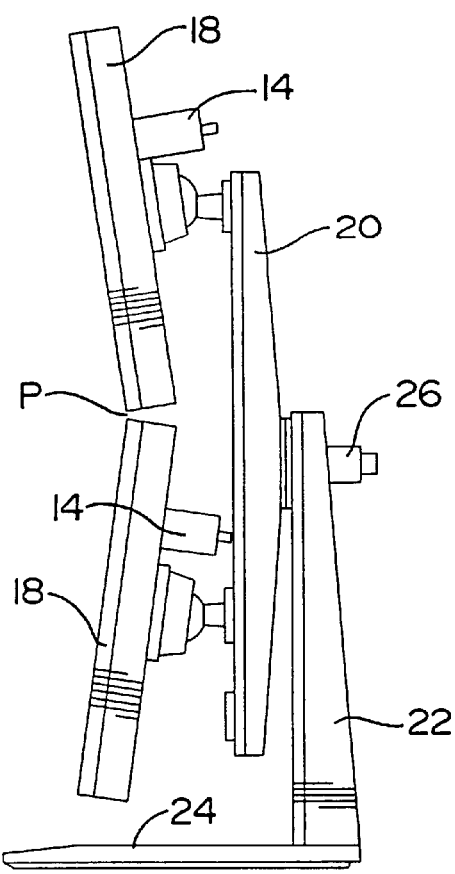
FIG 6
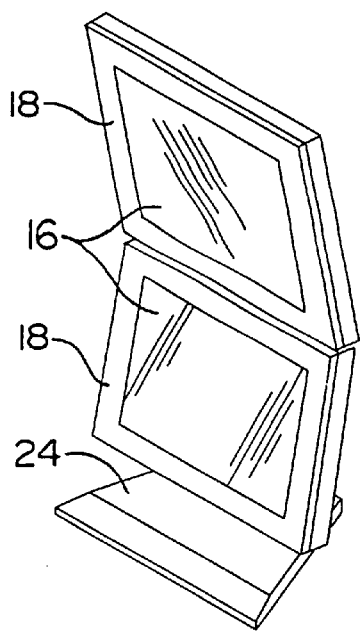
FIG 5

FIG 8
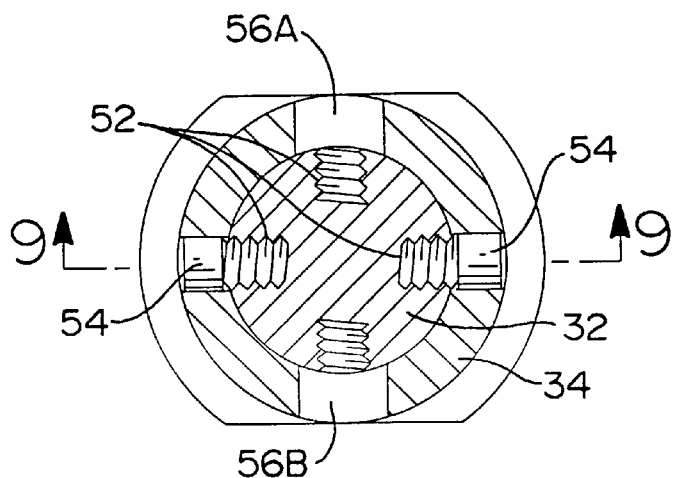
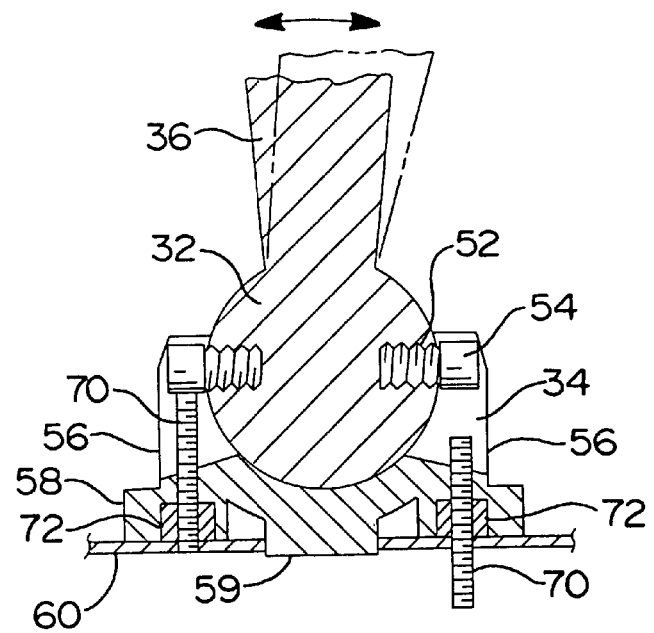
FIG 9

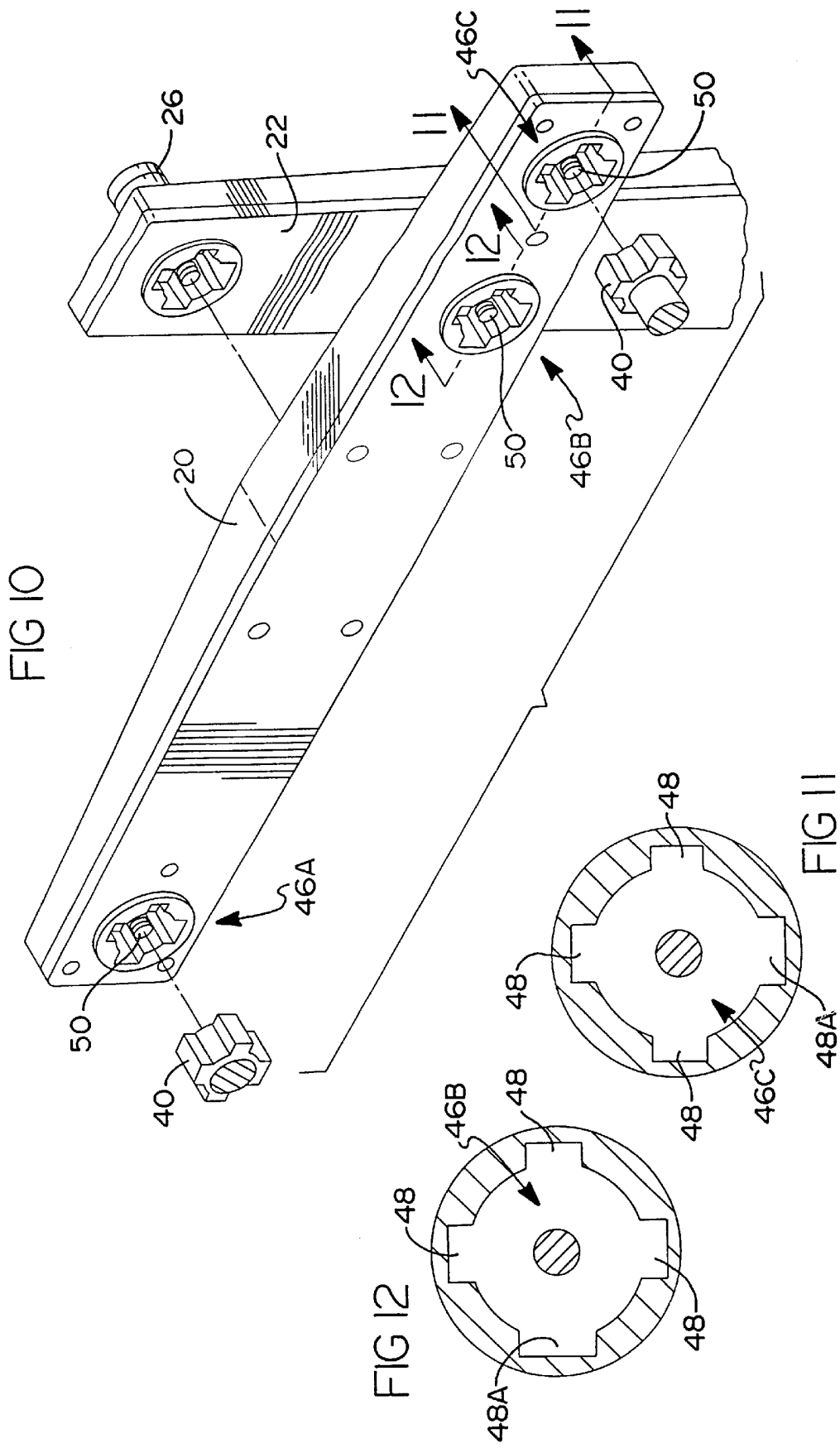

FIG 30
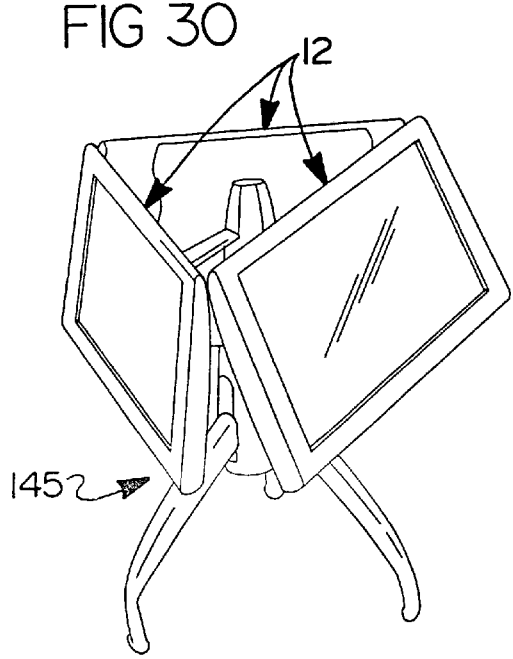
FIG 31
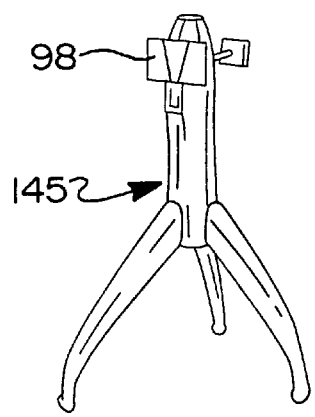
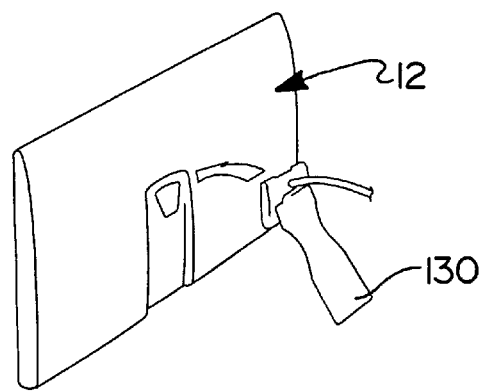
FIG 32

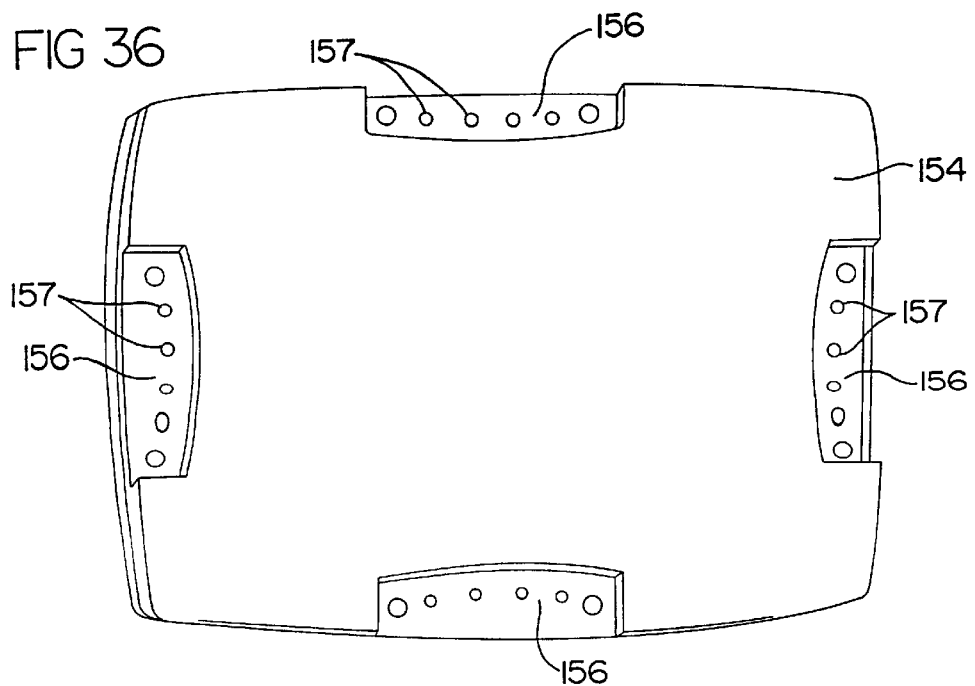
FIG 36
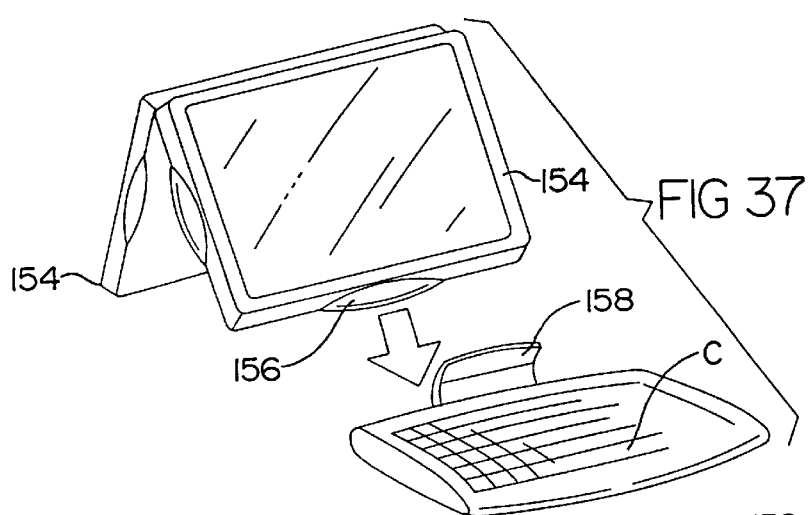
FIG 37
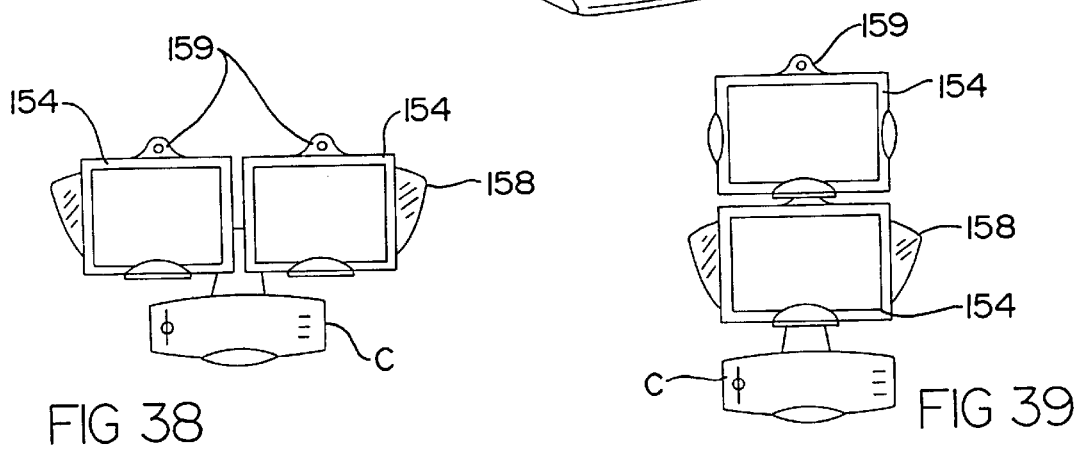
FIG 38
FIG 39

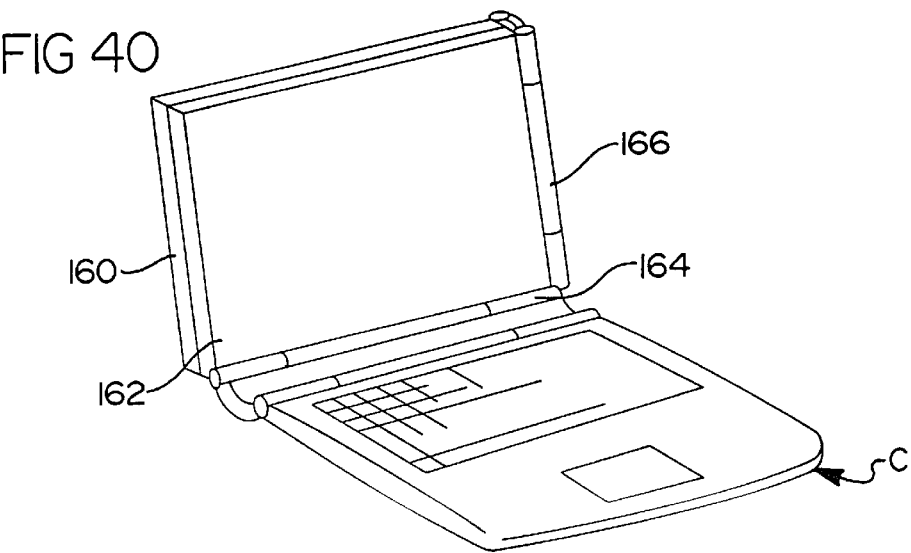
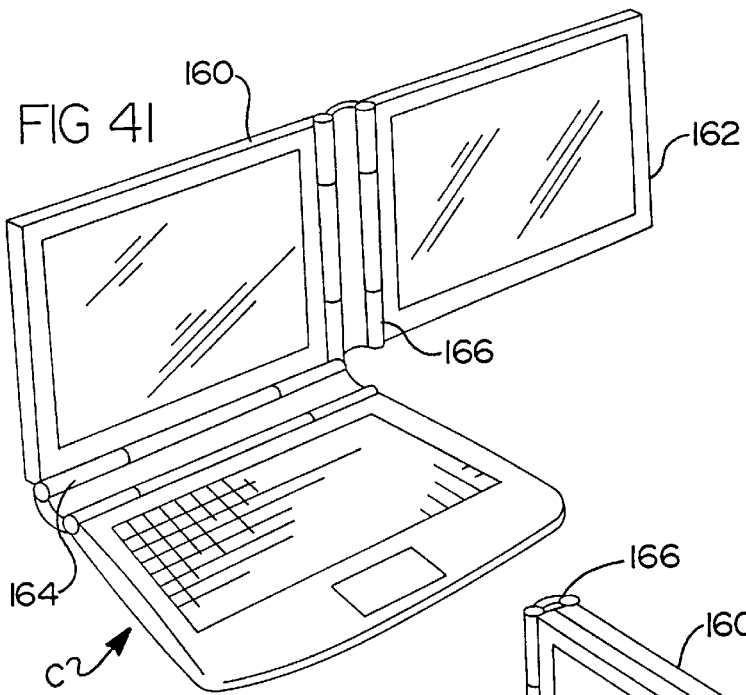
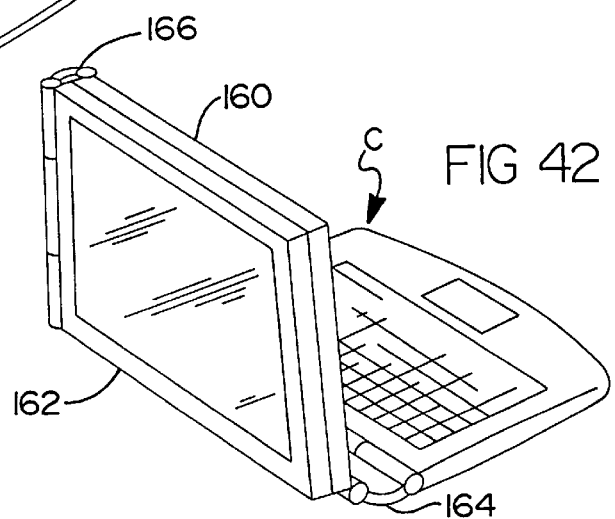

FIG 50
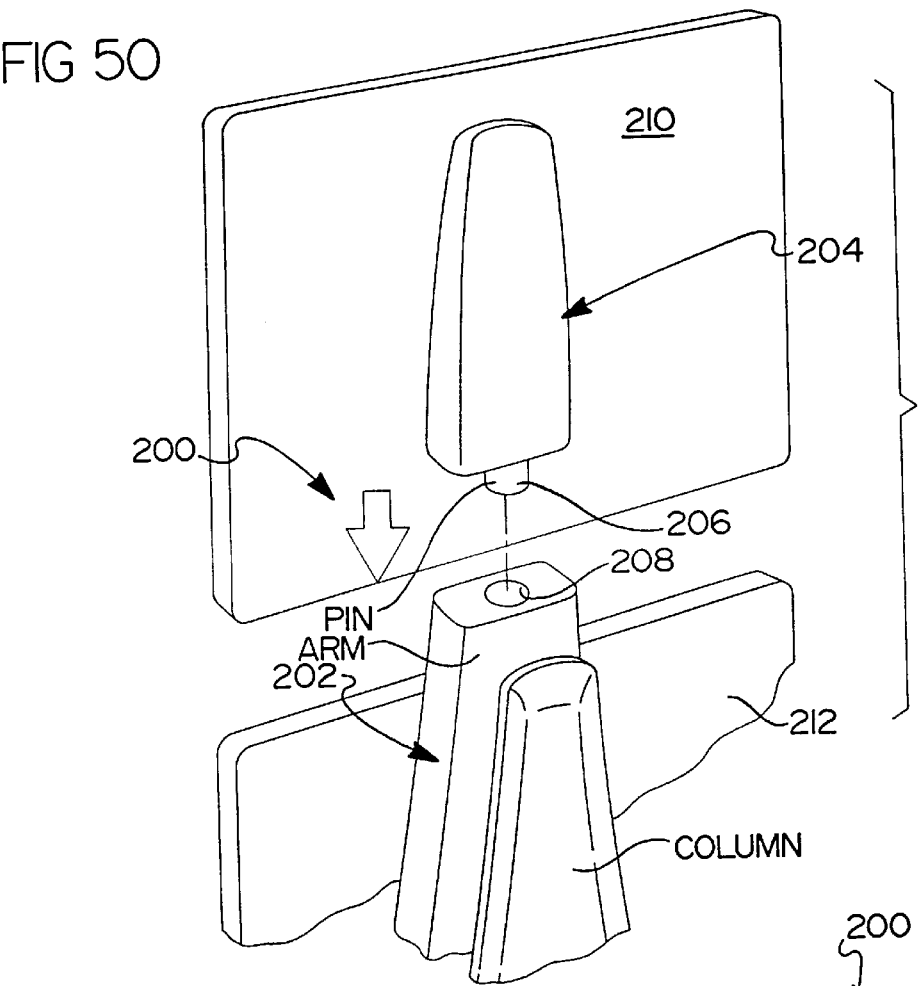
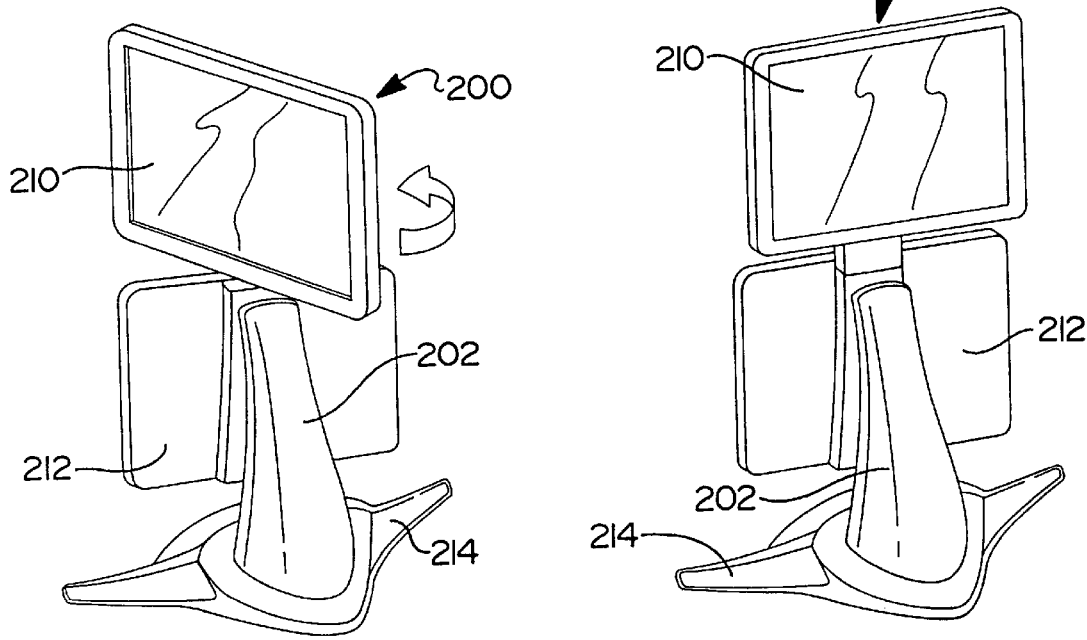
FIG 51  FIG 52

OPTION A

OPTION B

OPTION B IS OBTAIN BY PLACING ARM 2 AT THE TOP HOLE OF ARM 1

COMPUTER DISPLAY SCREEN SYSTEM AND ADJUSTABLE SCREEN MOUNT, AND SWINGING SCREENS THEREFOR

This application claims benefit of provisional application 60/109,668 filed Nov. 20, 1998.

TECHNICAL FIELD

The invention relates generally to electronic displays having dual display screens used with computers and CAD design equipment, and more particularly to a display system permitting positioning of dual display screens in an infolded "booking" mode, and to a novel dismountable joint for mounting articles, such as display screens. Also disclosed is an interchangeable display screen and mounting.

BACKGROUND OF THE INVENTION

Computers are readily adapted to operate multiple displays. Paired monitors and screens are useful when large amounts of related information, such as data or graphics, must be compared. Paired monitors can be inconvenient, however, where limited desk space is available. Monitors may be horizontally aligned, or vertically aligned. It is especially desirable to permit swinging of the monitor orientations together into a "booking" mode.

The invention also relates to a novel swingable mounting, which is suitable for mounting a variety of different pieces of equipment and instruments particularly for example video cameras, telescopes, mirrors, and any number of different articles, which it may be desired to swing into a position from which the article is not easily displaced.

The invention also relates to an interchangeable computer display screen, in which one or more of a variety of screen configurations can be connected or disconnected in various configurations with a computer.

SUMMARY OF THE INVENTION

In one aspect, the invention provides a display system having two screens and comprising a base, a pair of electronic displays mounted on the base and means for swingably mounting the display screens, for swinging towards one another for convenient viewing. The swinging means includes an arm assembly which supports the display screens on the base. The support for the arm assembly from the base may have an orientation relative to the base in which the display screens are positioned in vertically stacked screen relationship and may also have a different orientation in which the display screens are positioned in a horizontal, side by side relationship. Each display screen has a swingable joint connecting it to the arm assembly to permit adjustment of its angular orientation relative to the other screen. The angular orientation of each of the display screens relative to the arm assembly can thus be set by the user so as to orient each display screen in the desired angular orientation for that operator.

In one implementation of the invention, the arm assembly can be set in one position about a generally horizontal axis relative to the base, and the display screens can be swung together relative to the arm assembly. The arm assembly may be locked in either orientations, typically vertical or horizontal. Each display screen may be permitted to swing only between a pair of angular positions relative to the arm assembly by controls in the swingable joints.

The displays will often be horizontally arranged side by side in their operative angular orientation. It will generally be desirable to minimize the spacing between edges of the display screens whether vertically registered or horizontally registered. To that end, the center-to-center spacing between the display screens is preferably reduced when the screens are swung together.

The swingable mounting joints connecting the display screens to the arm assembly are preferably formed in such a way that they can be preconfigured either for a side by side orientation or for a vertically stacked orientation of the screens, with means being provided on the swingable joints to guide the assembly in one fashion or the other, and the arm assembly is preferably provided with connecting means connecting to the swingable joints, which cooperate with the means guiding the assembly.

The swingable joints are preferably provided with control abutments by means of which the swinging of the displays can be guided and controlled both when in their horizontal side-by-side arrangement and when in their vertically stacked arrangement, and the position and angular displacement of the two screens can be preset by adjustment of such positional controls during assembly.

A further feature of the invention is the provision of a unique form of spring-loaded pivot mount for mounting equipment, such as the display screen. The pivot mount is capable of adjusting the spring pressure on the pivot so that the article mounted on the pivot mount, in this case a screen can be adjusted, when grasped with both hands and moved, but which is otherwise highly resistant to movement due to frictional locking of the pivot mount.

The pivot mount has numerous other uses, other than mounting display screens as will be apparent from the following description.

Further aspects of the invention provide for the interchangeability of screens one with the other, so that larger or smaller screens may be used with the same computer, and so that screens may be used in various different positions.

In some cases the screens may simply be stood on a table. In other cases the screens may be wall-mounted or mounted on some form of base separate from the computer. In other cases the screens may be interchangeably and releasably mountable for example in a vehicle, and they may be configured in pairs so that they may be portable and set up for a multi screen display, for example, for viewing by a number of persons simultaneously.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

BRIEF DESCRIPTION OF THE DRAWINGS

The various advantages of the present invention will become apparent to one skilled in the art by reading the following specification and subjoined claims and by referencing the following drawings in which:

FIG. 4 is a top plan view of the dual display screens of FIG. 1;

FIG. 5 is a perspective illustration of dual display screen shown with the screens in vertical arrangement one above the other;

FIG. 6 is a side-elevation of FIG. 5 showing the screens tilted towards one another;

FIG. 8 is a section along the line 8—8 of FIG. 7;

FIG. 9 is a section along the line 9—9 of FIG. 7;

FIG. 10 is an exploded perspective illustration of an arm assembly, and showing cut away portions of the swingable joints;

FIG. 11 is a section along the line 11—11 of FIG. 10, showing the two components assembled;

FIG. 12 is a section along the line 12—12 of FIG. 10 showing the two parts assembled;

FIG. 30 is a perspective illustration of an alternate form of tripod display stand for holding three displays for example, on a conference room table or the like;

FIG. 31 is a perspective illustration of the tripod support of FIG. 30;

FIG. 32 is a rear perspective partially exploded view of another form of dismountable display leg for a display screen;

FIG. 36 is a rear perspective view of another form of display screen, showing attachment recesses for various components;

FIG. 37 is a perspective illustration of, for example, a lap top computer showing two display screens such as that illustrated in FIG. 36, being attachable to a hinge mounting on the computer;

FIG. 38 is a front elevational view of a pair of display screens as illustrated in FIG. 36 shown side by side;

FIG. 39 is a front elevational view corresponding to FIG. 38, but showing the two display screens one above the other;

FIG. 40 shows an illustration of a further embodiment of invention with a computer having two display screens joined along the side by a hinge;

FIG. 41 shows the computer of FIG. 40 with the two display screens swung out side by side;

FIG. 42 shows the same computer with the two screens swung back to back, so as to display in opposite directions;

FIG. 50 is a perspective view of an alternative preferred embodiment of a display system of the present invention incorporating a rotating support member to enable a LCD panel to be rotated about a vertical axis;

FIG. 51 is a perspective view illustrating an upper LCD panel mounted for swiveling movement relative to a lower LCD panel using the system shown in FIG. 50;

FIG. 52 is a perspective view of the display system shown in FIG. 51 showing the two LCD panels facing in opposite directions;

DETAILED DESCRIPTION OF THE PREFERRED EMBODIMENTS

As already explained, the invention in this particular embodiment illustrated, has its application to the use of dual display screens, which can be used to display two different computer images simultaneously. This may have application for example in CAD computer design application. For these and other purposes it is particularly useful if the two screens or displays can be tilted towards one another so that they appear in the form more or less of two pages of an open book. The screens are preferably arranged side by side, in horizontal alignment, but may also be arranged vertically one above the other.

Figure 1:
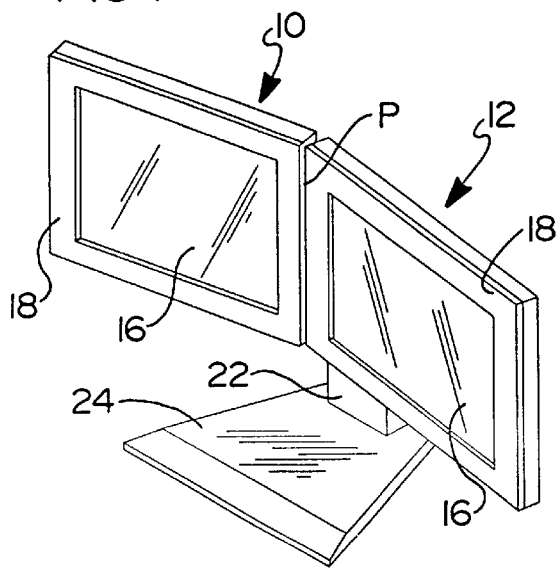
FIG. 1 is a perspective illustration of a dual display screen system, showing swinging movement of the two screens towards one another.
Figure 2:
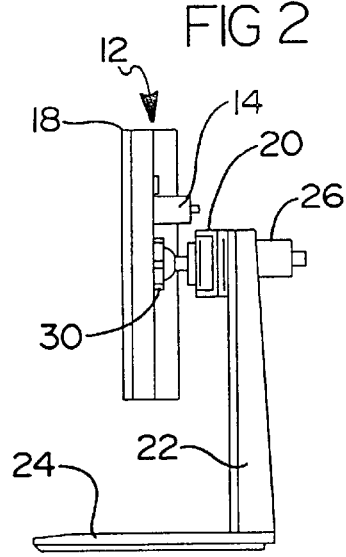
FIG. 2 is a side-elevation of FIG. 1.
Figure 3:
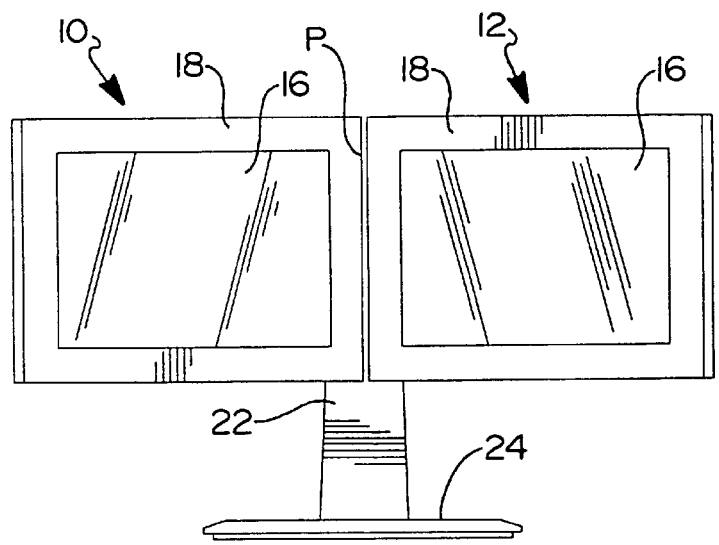
FIG. 3 is a front-elevation of the dual display screens of FIG. 1.

Referring now to FIGS. 1, 2 and 3, the invention is there illustrated as in the form of a pair of video display screens 10 and 12, each of which may be of known construction, but which may typically be liquid crystal displays (LCDs) for example. They are each provided with video terminal connectors 14 (FIG. 2) by means of which they may be connected to a computer.

Each of the screens 10 and 12 comprises a central rectangular display portion 16, and a rectangular marginal frame 18.

The two display screens 10 and 12 are mounted at opposite ends of a mounting arm 20. The mounting arm 20 is itself supported on an upright stand 22 and a base 24. The arm 20 may be connected to the base 22 by a coupling means 26 (FIG. 4) by means of which the arm may be attached during assembly, either horizontally, or vertically (FIG. 6) prior to delivery to the customer.

In some cases the manufacturer may simply make the arm permanently attached in one position, i.e. horizontal or the other i.e. vertical, to reduce expense.

As will be noted in FIGS. 2 and 4, each of the displays 10 and 12 is mounted on respective free ends of arm 20, by means of a swingable mounting means 28 and 30 respectively.

The swingable mounting means 28 and 30 are so constructed as to permit the two screens 10 and 12 to be swung together towards one another, into the configuration shown in FIGS. 1 and 4, in which they both remain in the same upright planes, and in which they are both swung towards one another by equal angles. In this way, as the two screens 10 and 12 are swung towards one another into this configuration, the angular displacement of one screen is equal to the angular displacement of the other screen, so that the two frames 18 of the screens 10 and 12 substantially meet at a central point indicated generally as P, thus bringing the two screens 16—16 as close as possible together and at the same time, as far as possible, simulating the appearance of two pages of a book opened up.

It will be observed that when the arm 20 is fastened in its vertical position as shown in FIGS. 5, the lower one of the two screens 10 and 12 is moved up the arm, because in the vertically stacked orientation, the rectangular screens have a shorter vertical dimension, and it is desirable that they should be as close to one another as possible when they are swung together, so that the longer sides meet at point P.

From the foregoing description it will be understood that it is desirable that the two screens can be swung together into their inwardly angled relation as shown in FIGS. 1 and 4, or FIG. 6, but that the screens should be capable of being tilted only to a limited degree in any other direction relative to one another, since this might reduce the clarity of the dual display. However, the two screens may be tilted slightly upwardly, or downwardly by similar angular displacements. In this way the simulation of an open book arrangement is maintained.

For these reasons, the two display screens 10 and 12 are mounted on the arm 20 by means of the swingable mountings 28 and 30. These mountings will now be described in greater detail with regard to FIGS. 7, 8 and 9.

Figure 7:
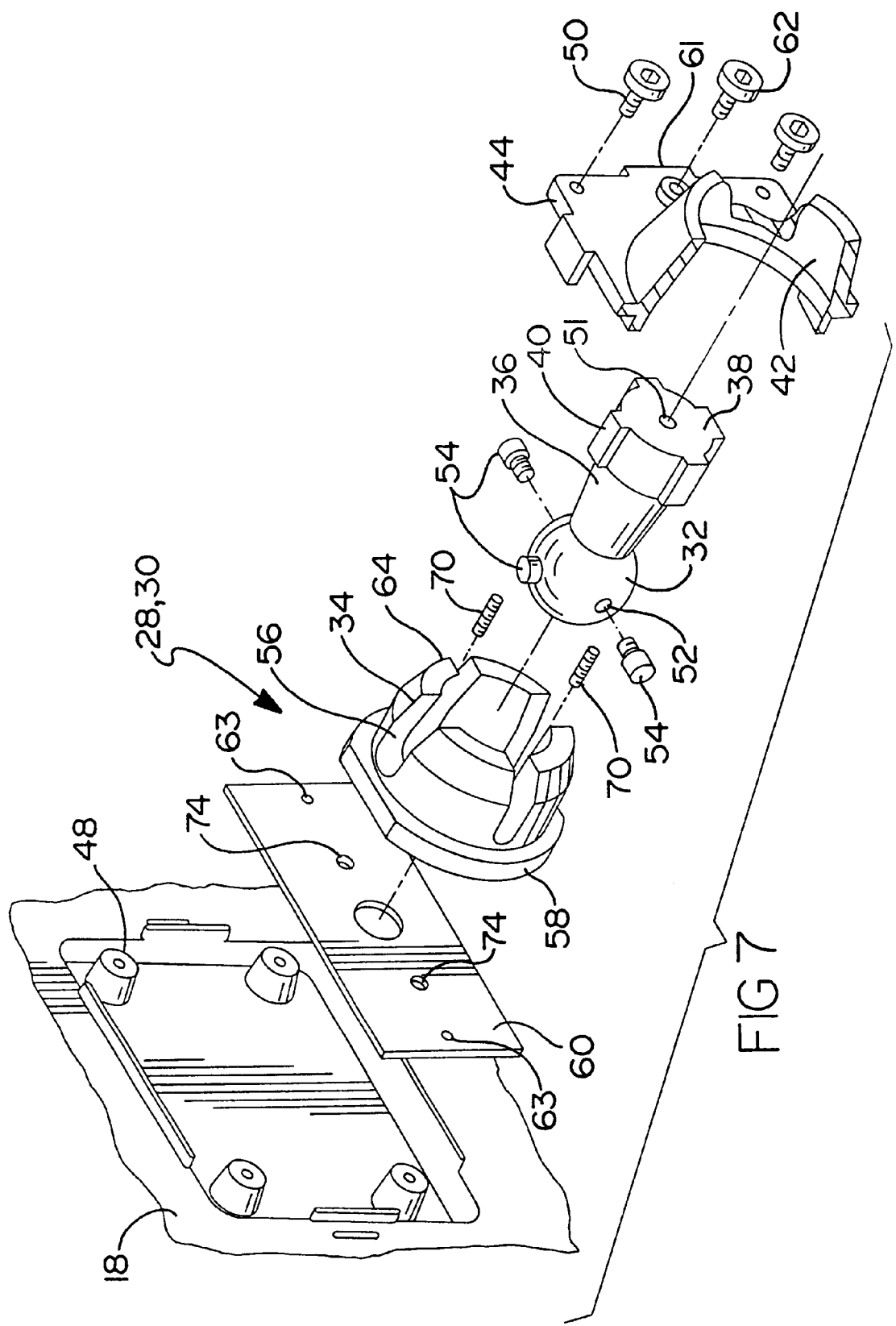
FIG. 7 is an exploded view of the pivot mount and ball joint used in this embodiment of the invention.
Figure 13:
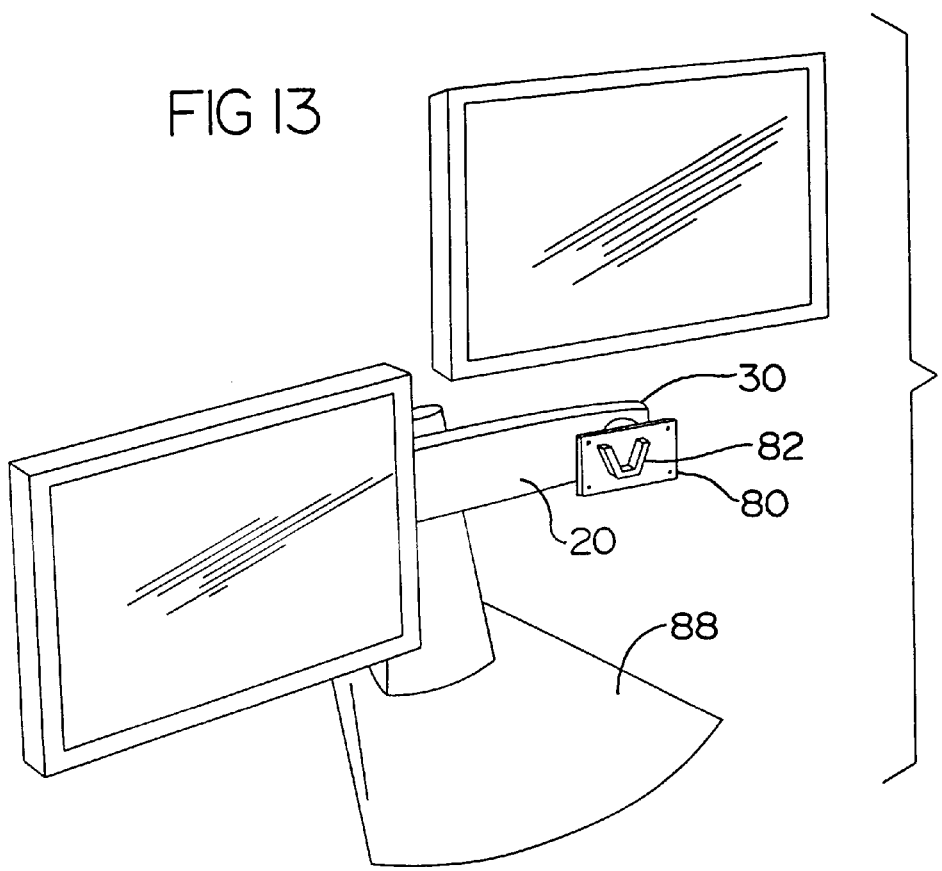
FIG. 13 is a perspective partly exploded illustration showing an alternative interchangeable mounting system for mounting the screens.
Figure 14:
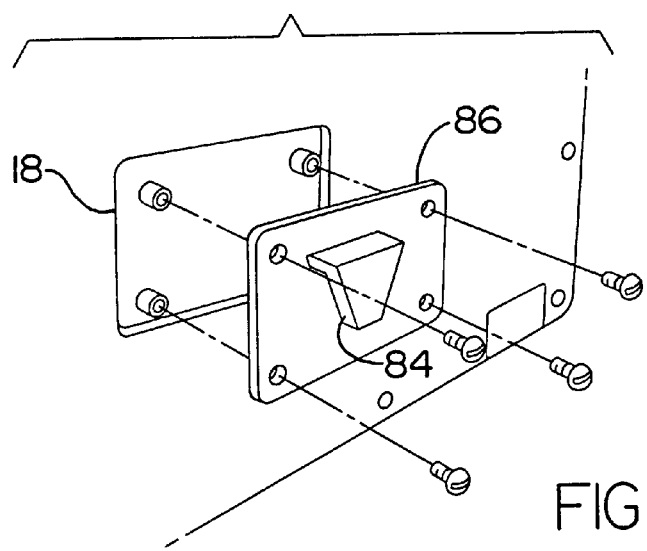
FIG. 14 is an exploded rear perspective illustration of a complementary portion of the mounting system, which is fitted to the back of each screen.
Figure 15:
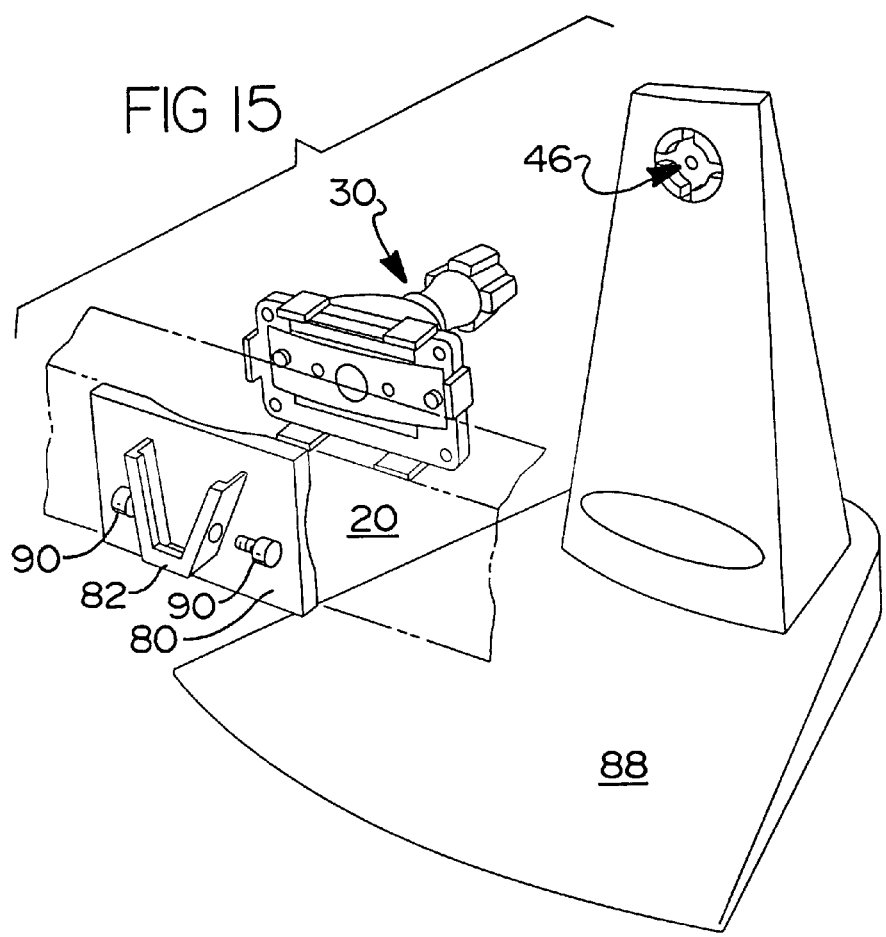
FIG. 15 is an exploded perspective illustration showing the interchangeable mounting system of the invention coupled with a ball joint similar to that shown in FIG. 12, to enable a screen to be mounted on a stand separately from the computer.
Figure 16:
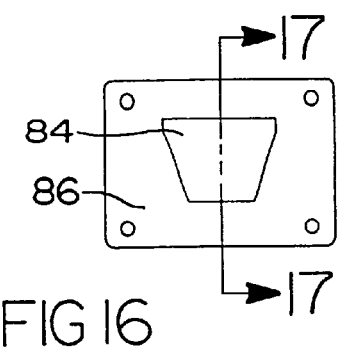
FIG. 16 is a rear elevation of the complementary portion of the interchangeable mounting system mounted on the back of a screen.
Figure 17:
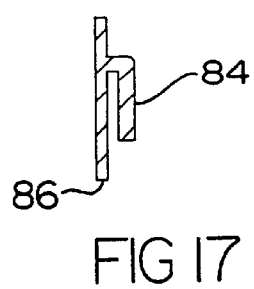
FIG. 17 is a section along the line 17—17 of FIG. 16.
Figure 18:
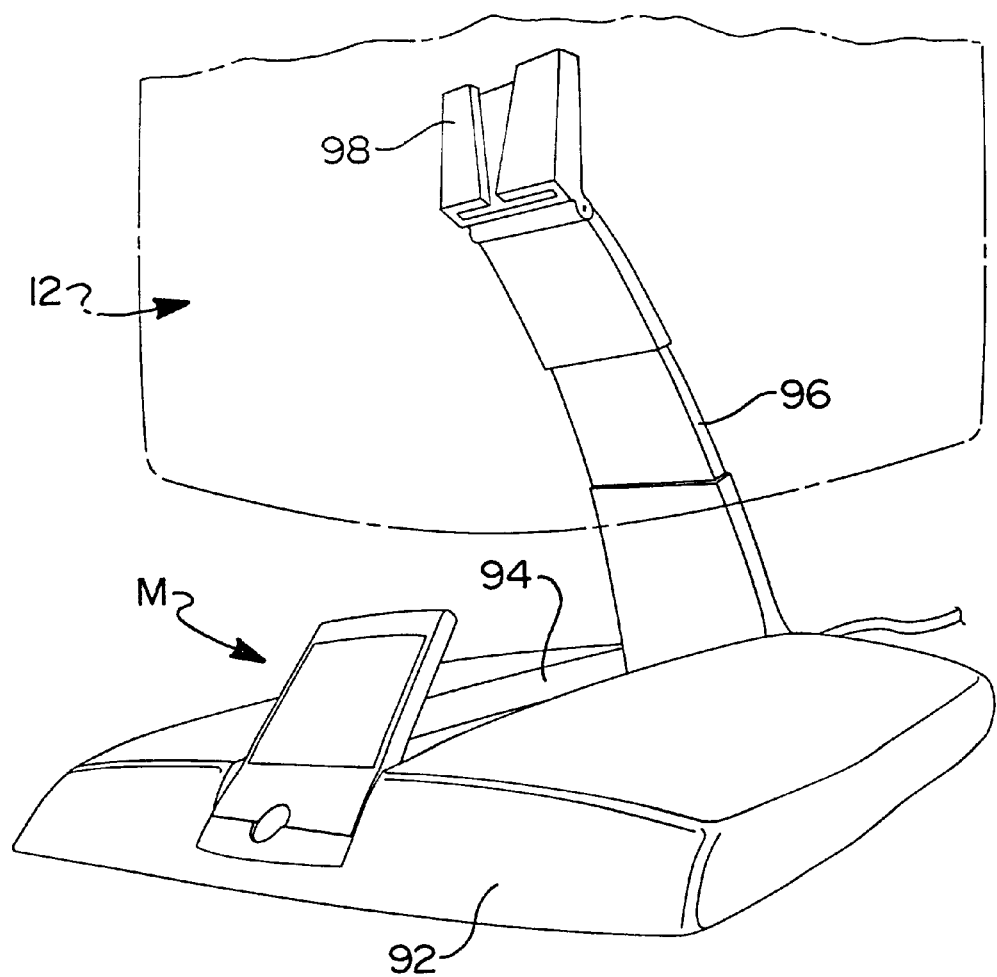
FIG. 18 is a perspective illustration partly in phantom of a modified form of stand for a computer screen.

FIG. 7 illustrates the mounting 28 or 30 in an exploded perspective view. The swingable joint consists essentially of a ball 32, and a socket 34, with the ball 32 being preferably cast out of a suitable material preferably a metallic material and the socket 34 being cast preferably of a somewhat resilient material such as a thermoplastic. The ball 32 is mounted on a neck 36, which extends from a generally rectangular junction block 38. The block 38 is formed with a plurality, in this case four, rectangular guide members 40, spaced apart at 90 degrees from one another around the block 38.

One of the guide members 40A, is wider than the other three guide members 40, to provide guidance when the guide members are assembled in a manner to be described below.

The block 38 and guide members 40 are designed to fit into suitable recesses in the arm 20 (described below).

A collar member 42 of generally semi-arcuate shape, is designed to fit over the block 38 and around the socket 34, for reasons to be described below. Collar 42 is formed with fastening flanges 44 by means of which it may be secured in position as described below.

In this particular embodiment, the arm 20 is provided at each end with three mounting recesses 46A, 46B and 46C. Each mounting recess 46 has four channel shaped grooves 48 formed therein spaced at ninety degrees therearound. The channel shaped grooves 48 are intended to receive the rectangular guide members 40 of the swingable joints.

One of the guide channel grooves 48A is wider than the others, to receive the wider one 40A of the rectangular guide members. In this way the guide members provide a keying function, which controls the positioning of the swingable joints and the display screen.

Bolts 50 align with the blocks 38, and are received in suitable threaded bores 51 (FIG. 7) and secure the assemblies in position.

The ball 32 is provided with a plurality, in this case four screw receiving bores 52, adapted to receive screws 54 therein. The sockets are spaced around the widest part of the ball 32, and are radially spaced apart by 90 degrees from one another. It will be appreciated that while there are four such bores 52, in certain circumstances only two or three screws 54 will be inserted, for reasons to be described below.

The heads of the screws 54 are cylindrical and protrude outwardly from the ball 32, and are received in respective slots 56 formed in socket 34. The ball 32 is a snug frictional fit within the interior of socket 34, so that a significant twisting moment is required to rotate the ball within the socket.

Clearly depending on the number of screws 54 in position, the actual movement of the ball in the socket is restricted. Thus for example if there are three such screws 54 in position, two of the screws 54 will simply limit the movement of the ball 32, so that the ball 32 can virtually be moved only around the axis of the two screws 54. If a third screw 54 is inserted then it will restrict movement of the ball so that it can be rotated only in such a fashion that the screw 54 rides along its respective groove 56, but that it will not be able to move significantly in the reverse angular direction.

For reasons to be described below, two of the slots 56A and 56B are wider and the other two slots 56 are narrower.

The socket 34 has a generally annular base 58, and a spring loaded plate 60 abuts against the annular base 58. The shape of the socket 34 is such that a small cylindrical boss 59 project through a registering opening in the spring plate 60, (FIG. 9).

The spring plate 60 is secured in position by means of screws 62 passing through suitable registering openings 61 on the flange 44 of the collar 42, and secured in threaded openings 63 in plate 60.

By tightening or loosening the screws 62, it is possible to apply greater or lesser pressure by flexing the plate 60 against the rear surface of socket 34, and thus adjust the friction between the surface of the ball 32 in the socket 34. In this way it is possible to preset the rotational force or torque that would be require to rotate the ball in the socket.

Additional control of the friction on the ball is provided by means of the frusto-conical collar 42. This mates with frusto-conical bevels 64 on the exterior of collar 34. Thus by tightening or loosening the screws 50 in the sockets 48, the collar 42 can be made to squeeze and wedge the four sides of the socket 34 together tightly around the ball 32 and thus still further control the friction applied by the socket 34 to the ball 32.

In order to further control and limit the swinging of the ball 32 and stem 36 relative to the socket 34, limiting screws 70—70 are provided, which can be inserted or removed in suitable threaded inserts 72—72 in annular base 58 of socket 34.

One or more such screws 70 can be inserted (FIG. 9) and can be adjustably positioned, so as to abut against the cylindrical heads of screws 54, and thus limit swinging of the ball 32.

Access to screws 70 can be obtained through registering opening 74 in plate 60.

As mentioned, all of these settings would be preset in the factory before shipment, so that in use the actual scope of movement of the display screen, by means of rotating the ball 32 in the socket 34 is substantially restricted or limited.

It will thus be seen that the novel ball and socket joint described provides a great degree of control on the angular position of the article attached to it, in this case the screens 10 or 12. In fact, by suitable adjustments in the factory, the friction on the ball 32 can be made sufficiently tight that it is substantially impossible to manually move the arm 36 on which the ball 32 is mounted, simply by grasping the block 38.

However, the friction can be so adjusted that by grasping the two edges of the display screen, the position of the display screen can be manually adjusted to the most suitable position, and once adjusted it will remain substantially fixed in that position.

Thus, once the block 38 is inserted in position in its socket in the arm, and locked in position, then by grasping the two side frames of the screen, sufficient torque can be applied, to adjust the position of the screen and rotate the ball 32 in the socket 34 until the screen is in the desired position.

In accordance with various further embodiments of the invention as illustrated in FIGS. 13 through 29, the invention provides for a still greater range of interchangeability either as between one screen and another screen for computer, which may facilitate either the use of a small portable screen or a much larger screen, or the use of a plurality of screens, or the ready interchangeability of simple forms of screen mountings.

FIGS. 13, 14, 15 and 16 indicate one form of interchangeable screen attachment, being a further embodiment of the ball and socket joint as illustrated in FIGS. 7 through 12. In this further embodiment, a modified form of plate 80 is secured to the ball and socket joint 28–30. The plate 8 in this case is formed with a generally V-shaped socket 82, the edges of the V-shaped socket being formed with flanges. A complementary attachment plug 84 is mounted on a plate 86 which is secured to the back of the screen 18. In this embodiment the arm 20 is shown mounted on an independent base stand 88, and the actual computer and keyboard may be located elsewhere and simply connected by suitable coupling cables (not shown) so that the entire arrangement of displays and mounting arm can be positioned wherever it is most convenient.

Figure 19:
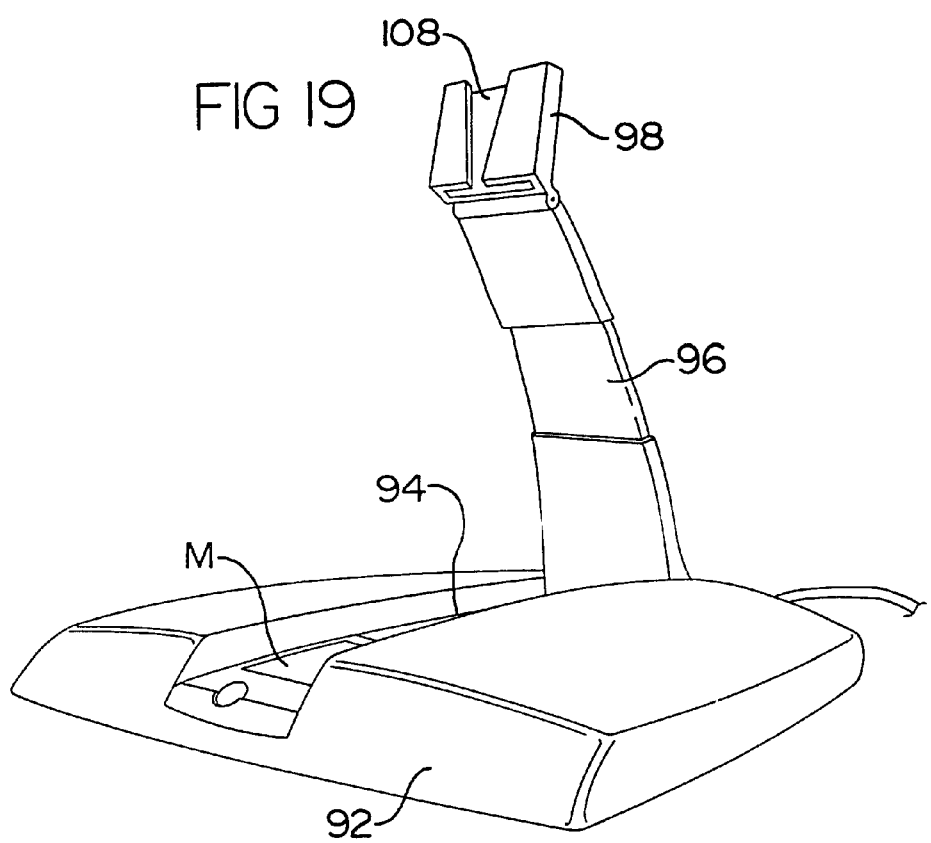
FIG. 19 is a perspective illustration of a stand somewhat similar to FIG. 18, with a collapsible stand arm nesting in a base.
Figure 19A:
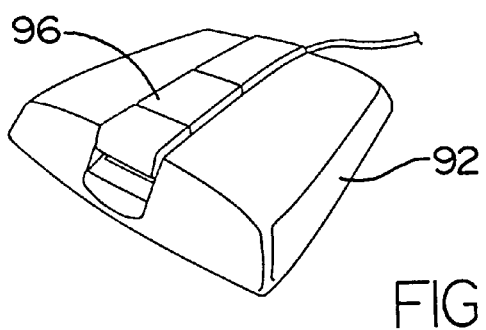
FIG. 19a is a perspective of the unit of FIG. 19 folded and nested for storage or carrying.

In this embodiment, for added security, locking screws 90 may be provided in either side of the V-shaped recess 82. The flexibility of the interchangeable screen system according to the invention is further illustrated in FIGS. 18 and 19. In this case, a portable mounting base for a single display screen may be provided. In this case a base 92 is formed with a groove 94. A swingable upright arm 96 is swingable into and out of the groove 94. The arm 26 may have a telescopic ability, and may be provided with a V-shaped retaining slot 98 at its upper end, for retaining a display screen shown in phantom as 12, having a mounting plug 84 formed to fit the slot 98. If desired the slot 94 may also be arranged to hold a manual computer "mouse" device of a type well known in computer art indicated generally as M, giving a limited degree of control over the display on the screen. FIG. 19a illustrates the device with the arm 94 swung downwardly into the groove 92 and nested.

Figure 20:
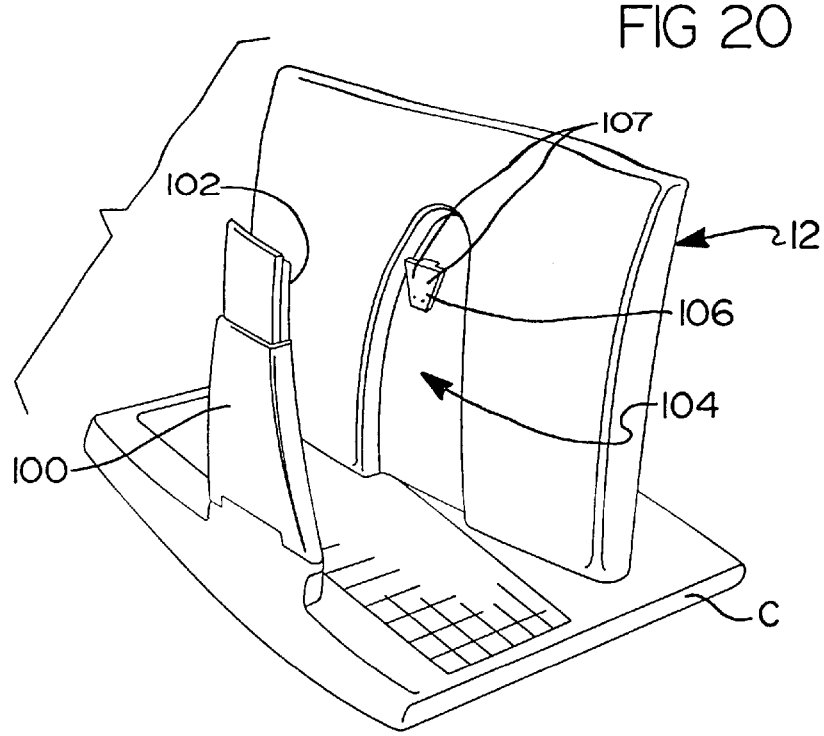
FIG. 20 is a rear perspective illustration partly exploded showing a modified form of computer together with a display releasible mounted on an arm extending from the computer.

FIG. 20 illustrates a modification of this concept, in which for example a computer of the lap-top type indicated generally as C may be provided with a swingable support arm 100, having a V-shaped slot 102 at its upper end similar to the slot 98. A display screen indicated generally as 12 may have a mating groove or recess 104 adapted to receive the arm 100, and within the groove 104 there is a V-shaped locking flange 106 shaped to mate with the V-shaped slot 102. The locking flange 106 can be provided with electrical contacts 107. Contacts 107 can be arranged to contact matching contacts 108 (FIG. 19), in the V shaped slot 102. This arrangement can be used in all these embodiments to avoid the use of cables wherever possible.

In this way the entire combination of lap-top computer and display 12 can be fitted together and swung down into a closed position for carrying or storage and can be swung upwardly for use, and if desired, the screen 12 as illustrated can be easily removed and a screen having different characteristics or a larger screen can simply be snapped in position, if desired.

Figure 21:
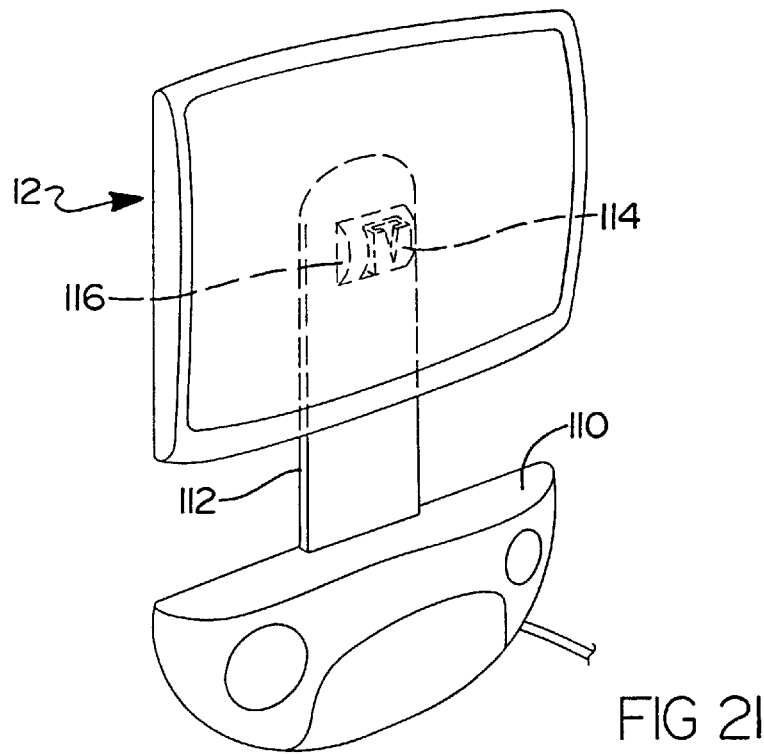
FIG. 21 is a front perspective illustration of a wall-mounted form of interchangeable display screen together with a control panel.

FIG. 21 illustrates the adaptability of the system for use in for example the removable mounting of a display screen on a wall, or the side of a booth for example. In this case a wall mounting block 110 can be attached by any suitable fastening means (not shown) for securing the same to a vertical surface. The mounting block 110 may have finger operated controls similar to a computer "Mouse" for limited control of the display on the screen for demonstration or presentation purposes and may have speakers for combined audio and visual effects.

The display screen 12 itself can again simply be mounted on an upright arm 112 having at its upper end a generally V-shaped recessed body 114, preferably on a hinged mount 116. The screen 12 will be supplied with a suitable V-shaped locking flange on its rear surface (not shown) of the type already described.

Figure 22:
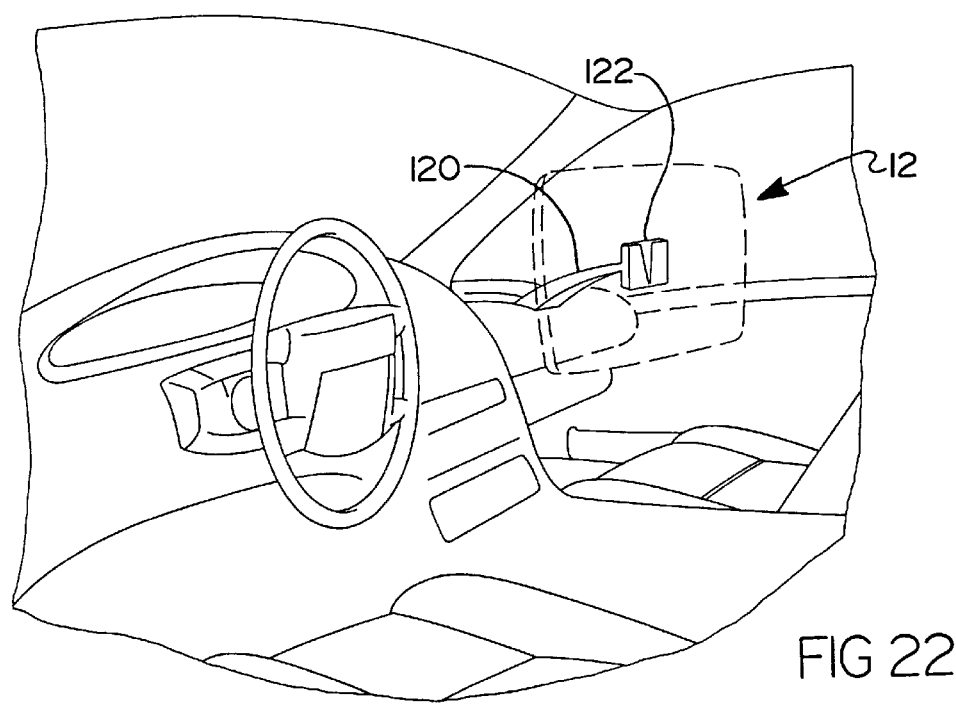
FIG. 22 is a schematic illustration showing an interchangeable mounting of a display screen in a vehicle.

FIG. 22 illustrates the same concept for the mounting of a display screen indicated as 12 in a vehicle. This may have application particularly for sales persons and for displaying maps of cities and the like, to assist drivers of delivery vehicles. In this case the display screen 12 can be mounted on an arm 120 secured at a suitable position on the front of the interior compartment of the vehicle. Again a releasable mount of the V-shaped slotted type shown as 122 is provided on the arm 120, and the screen 12 would be provided on its rear with a suitable inverted V-shaped locking flange fitting in the recess 122. There would also be provided matching electrical contacts, described above, in these components, to avoid the use of cables. In this way, the screen 12 could be placed and locked in position when it was required, and when the vehicle was parked the screen 122 could simply be easily dismounted and placed in the trunk, or taken out of the vehicle altogether, for greater security.

The screen 12 would be connected to a suitable small computer (not shown) again being of the portable type so that it could readily be removed from the vehicle.

Figure 23:
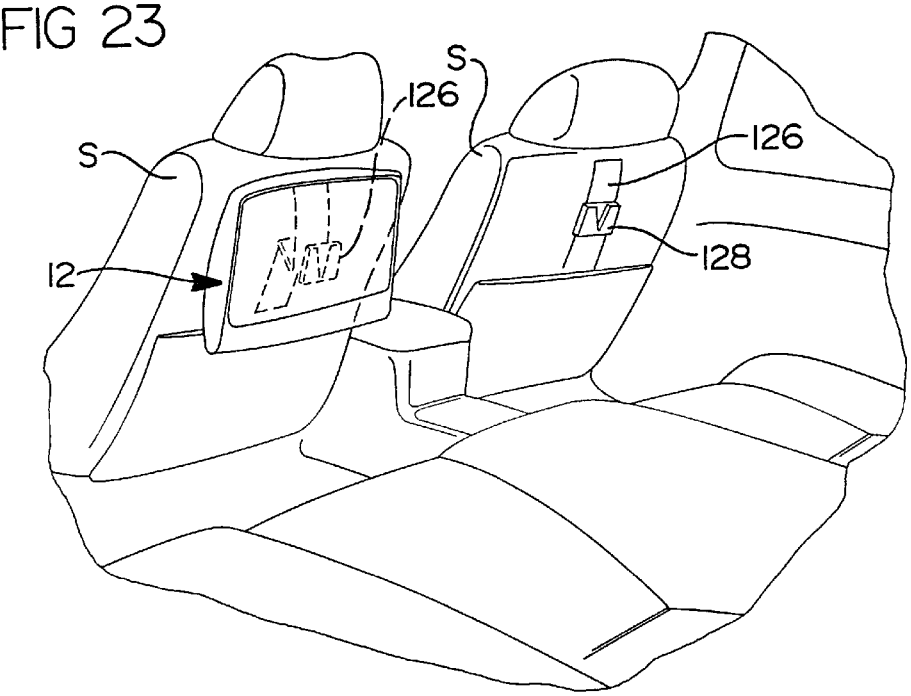
FIG. 23 is an illustration of another vehicle mounting of the interchangeable displays screen, in the rear compartment of the vehicle.

A somewhat similar arrangement could be made for the rear compartment of the vehicle illustrated in FIG. 23. In this case a swingable arm 126 is shown mounted in the rear surface of each of the front seats indicated as S in a vehicle.

A suitable V-shaped slotted mounting recess 128 would be mounted on the arm 126. The arm 126 could be swung out from the seat, and a display screen 12 could be mounted on the V-shaped recess.

Figure 24:
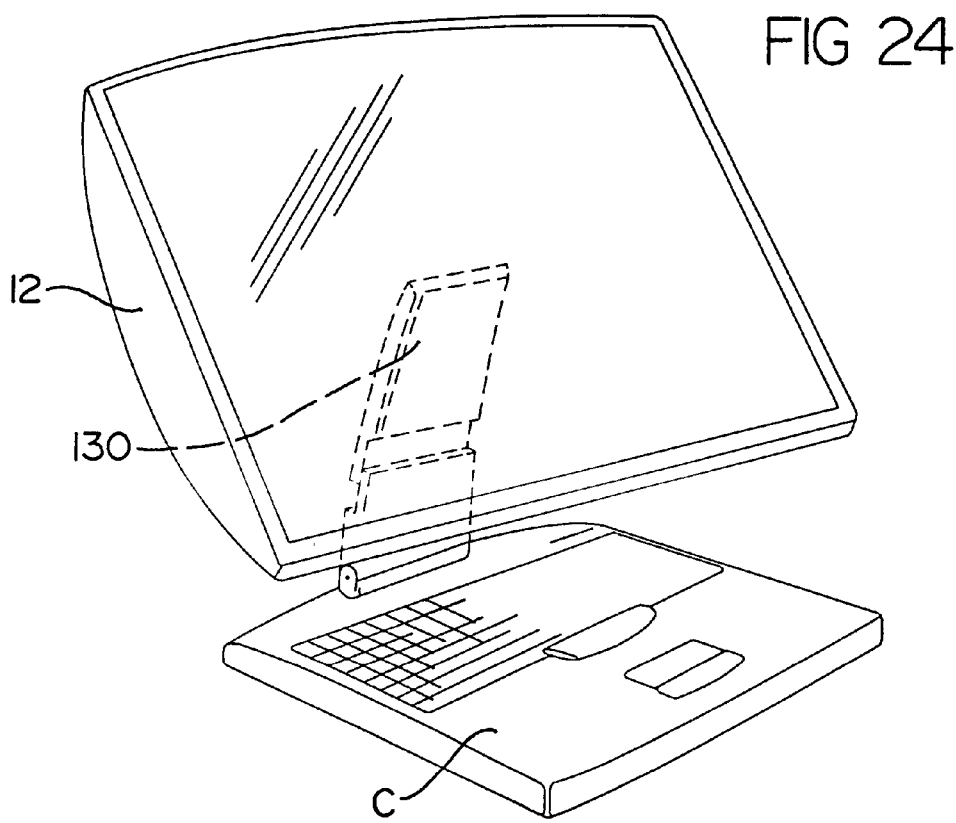
FIG. 24 is an illustration of a computer with a rear mounted support arm, and a greatly enlarged display screen fitted to the arm.

FIG. 24 illustrates a typical laptop computer C, having an enlarged display screen 12 mounted on a hinged arm 130, which is hinged to the rear of the computer. This illustrates the adaptability of the interchangeable screen mounting using the V-shaped recess and plug, so as to adapt a smaller laptop type computer C, with use with a much larger screen 12.

Figure 25:
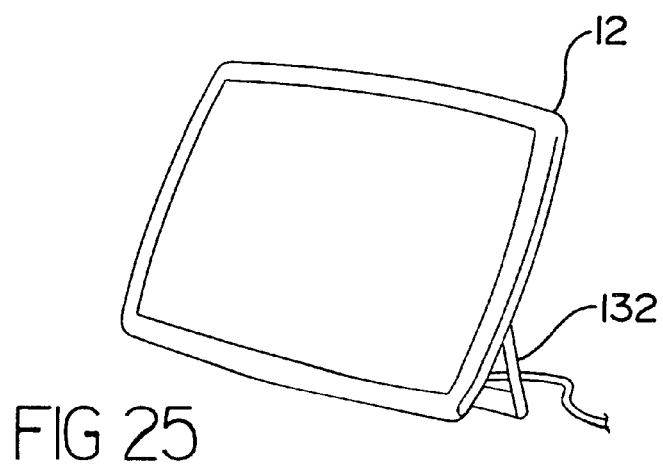
FIG. 25 is a perspective illustration of a table-mounted screen.

FIG. 25 illustrates the use of a free-standing screen 12 having a rearwardly mounted hinged leg 132, which can be swung rearwardly to support the screen at an angle somewhat in the manner of an easel. Again, the hinging leg 132 can be connected to the back of the screen 12 by interchangeable means such as the V-shaped recess and plug, if desired.

Figure 26:
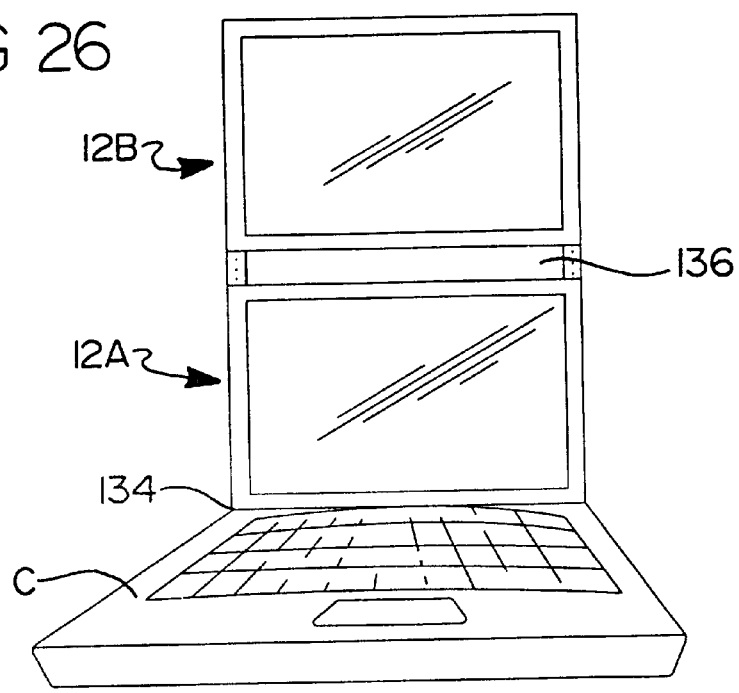
FIG. 26 shows a computer having two screens mounted one above the other, with a rotatable mount between the two screens.

FIG. 26 illustrates another configuration, in which a computer indicated generally as C may be provided with two screens 12A and 12B swingably and hingeably mounted to the rear edge of the computer C. The lower screen 12A is hinged along the line 134. The upper screen 12B is hinged to the lower screen 12A by means of the generally cylindrical tubular hinge bar 136.

Figure 27:
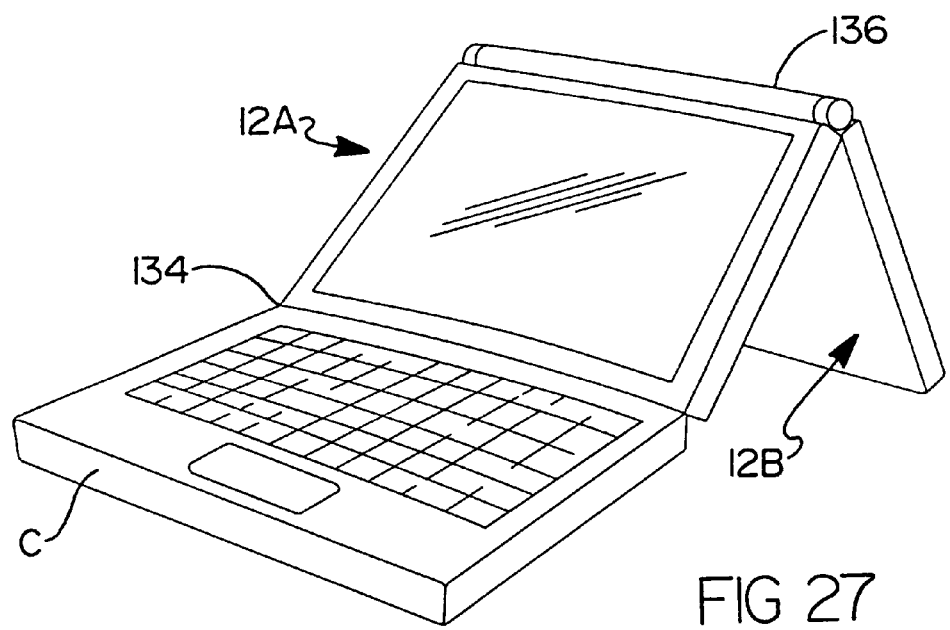
FIG. 27 is a view of the same computer as shown in FIG. 26 showing the two screens folded outwardly, so that the display can be viewed by two persons sitting opposite one another.

As illustrated in FIG. 27, the uppermost screen 12B can be swung into an obtuse angle relative to the lower screen 12A so that the two screens 12A and 12B can be viewed by at least two persons sitting opposite to one another. By means of suitable software, when the upper screen 12B is swung into the obtuse angle shown, the image on the screen 12B will be reversed, so that the images on screens 12A and 12B are both viewed the right way up.

Figure 29:
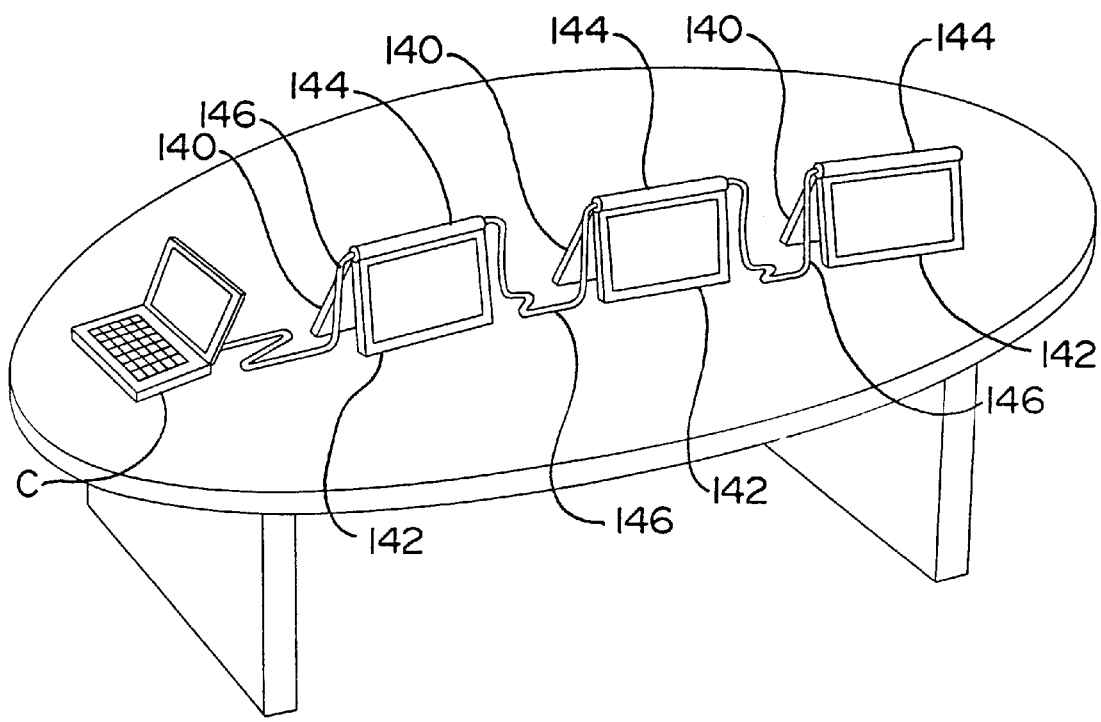
FIG. 29 is a perspective illustration showing a plurality of the display screens of FIG. 28 opened up so that they may stand on the table and face in opposite directions, and coupled to a computer.
Figure 28:
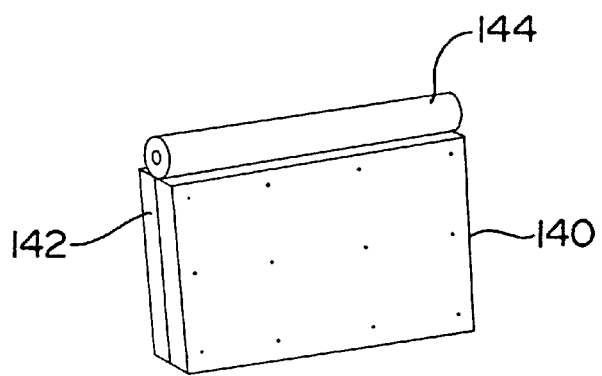
FIG. 28 is an illustration of a portable dual display screen with a hinging mount, the two screens being shown folded together in a stored or carrying position.

FIGS. 28 and 29 illustrate forms of free-standing dual screens indicated generally as 140 and 142, connected together by a tubular hinge bar 144.

The pairs of screens 140 and 142 can be swung open at obtuse angles to one another and stood on a surface such as a table as illustrated in FIG. 29. They may be connected to a computer C by means of daisy chain cables 146, which plug into opposite ends of the tubular hinge bar 144. As in the embodiment of FIGS. 26 and 27, the computer will contain suitable software the nature of which is to invert the image as between one screen and the other so that both screens show their respective images the right way up.

Various other modifications and adaptations can also be made using the principles of the invention.

Thus, FIG. 30 is a perspective illustration of an alternate form of tripod display stand 145 for holding three displays 12 for example, on a conference room able or the like.

FIG. 31 is a perspective illustration of the tripod support 145 of FIG. 30.

FIG. 32 is a rear perspective partially exploded view of another form of dismountable display leg 130 for a display screen 12.

Figure 33:
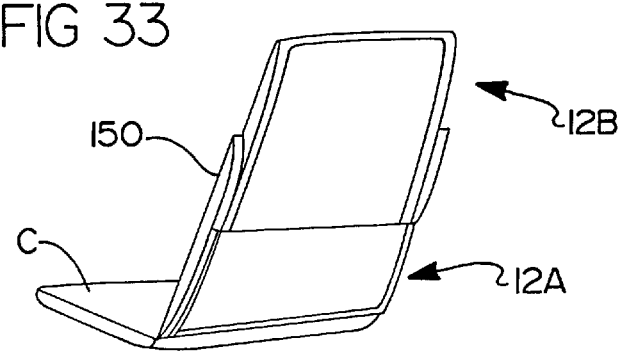
FIG. 33 is a rear perspective illustration of a typical lap top computer, having two display screens, the one being slidable relative to the other for nesting, or extendable for use.

FIG. 33 is a rear perspective illustration of a typical lap top computer C, having two display screens 12A and 12B, the one being slidable relative to the other for nesting, or extendable for use on arms 150.

Figure 34:
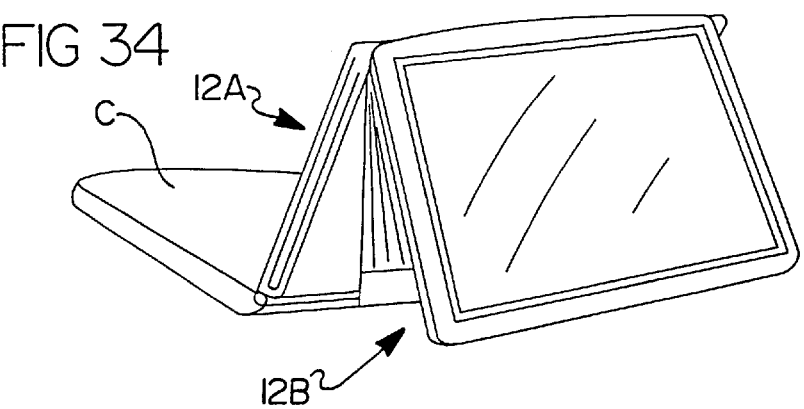
FIG. 34 is a perspective illustration of the lap top computer with dual display screens of FIG. 33 showing the display screens in another configuration.

FIG. 34 is a perspective illustration of the lap top computer C with dual display screens 12A and 12B of FIG. 33 showing the display screens in another configuration.

Figure 35:
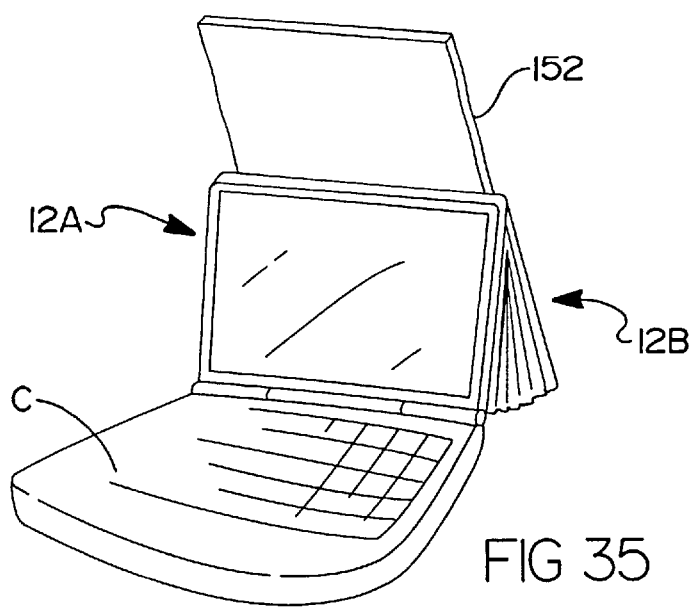
FIG. 35 is a perspective illustration of another form of lap top computer having two display screens, and showing a slidable cover panel for one of the two display screens.

FIG. 35 is a perspective illustration of another form of lap top computer C having two display screens 12A and 12B, and showing a slidable cover panel 152 for one of the two display screens.

FIG. 36 is a rear perspective view of another form of display screen 154, showing attachment recesses 156 for various components. Electrical connections 157 are incorporated in the recesses 156 for interconnection with matching contacts (not shown) in suitable accessories. Accessories may include audio speakers, and video cameras for direct feed back, to give only two examples.

FIG. 37 is a perspective illustration of, for example, a lap top computer C showing two display screens 154—154 such as that illustrated in FIG. 36, being attachable to a hinge mounting 158 on the computer.

FIG. 38 is a front elevational view of a pair of display screens 154—154 as illustrated in FIG. 36 shown side by side with audio speakers 158 and video cameras 159 attached.

FIG. 39 is a front elevational view corresponding to FIG. 38, but showing he two display screens 154—154 one above the other, As best shown in FIGS. 40, 41 and 42, a further embodiment of the invention may provide for a typical computer C having two display screens 160 and 162. The screen 160 is hinged to the computer by means of a hinge 164. The second screen 162 is hinged to the first screen by means of a vertical hinge along one side indicated as 166.

As best shown in FIGS. 41 and 42, the two screens 160 and 162 may either be swung out so that they are side by side with one another facing the operator of the computer C, or, as shown in FIG. 42, the two screens may be swung so that screen 162 is back to back with screen 160, thereby displaying the display both to the operator of the computer and to somebody sitting facing him. In this form of the invention special software and the like will not be required for the reversing of the images, since both images will be shown the right way up.

Figure 43:
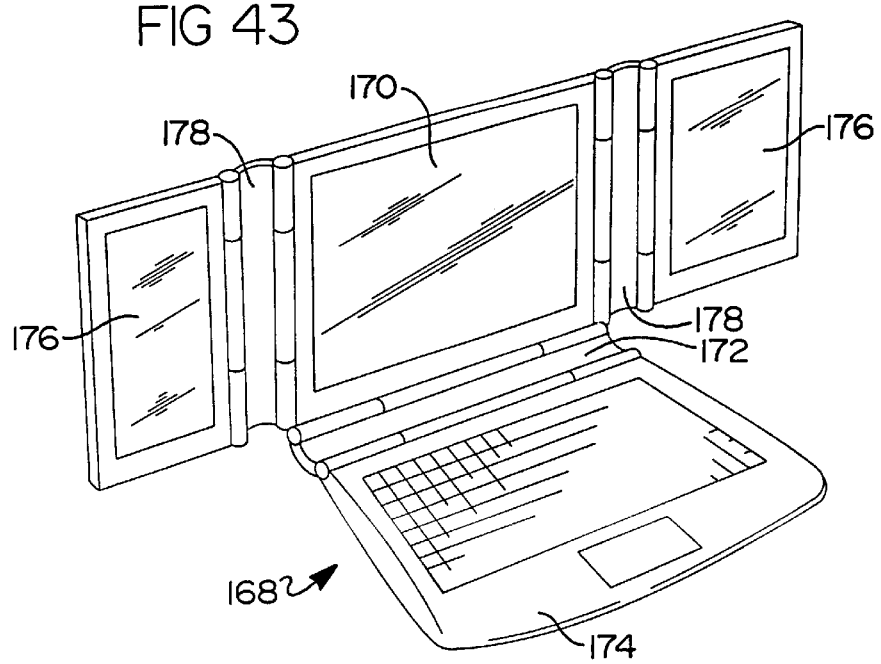
FIG. 43 is a perspective view of a laptop computer system incorporating a center LCD panel and a pair of half-width LCD panels on each side thereof, wherein the half-width panels may be folded over the center LCD panel and the entire display portion then folded down onto the keyboard portion of the laptop to form a compact assembly.
Figure 43A:
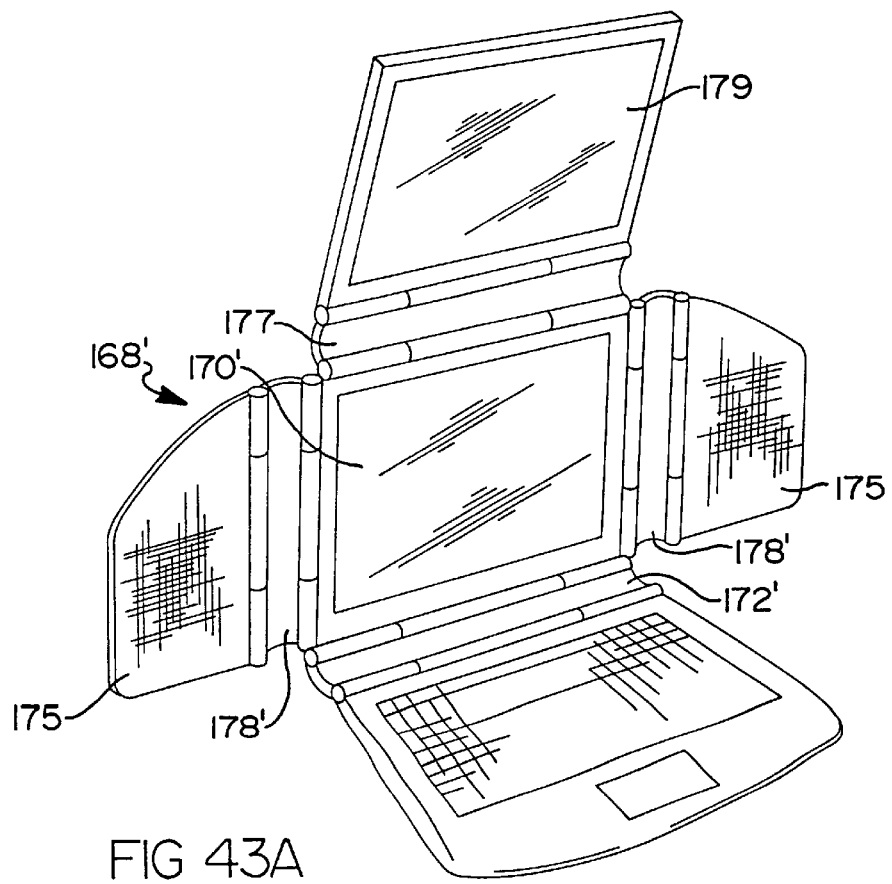
Figure 44:
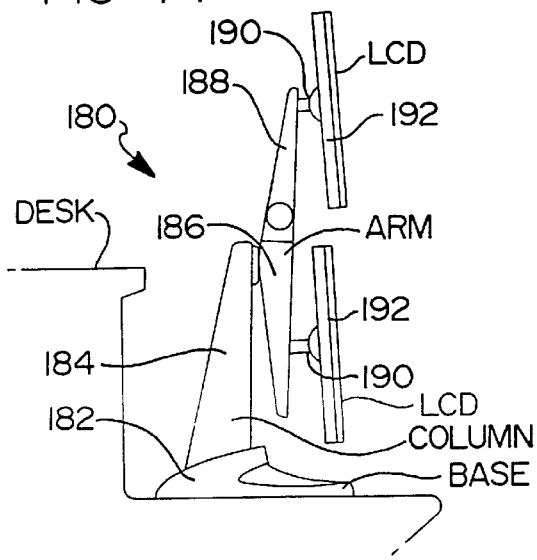
FIG. 44 is a side elevational view of a display system of the present invention incorporating a telescoping and pivoting upper support arm for positioning an upper LCD panel adjustably at a desired height above a lower LCD panel or in an orientation facing away from the lower LCD panel.

Referring now to FIG. 43, a computer 168 in accordance with another alternative preferred embodiment of the present invention is shown. The computer incorporates a center LCD panel 170 pivotably mounted by a hinge 172 to a base portion 174 of the computer. Pivotably supported on opposite sides of the center LCD panel 170 are a pair of LCD panels 176 which are each about one-half the width of the center LCD panel 170. The outer LCD panels 176 are supported by hinges 178, which may be identical in construction to hinge 172. The outer LCD panels 176 may be folded over the center LCD panel 170 and the entire display portion comprising panels 170 and 176 then folded down against the base 174 to form a compact unit that may be easily carried.

Referring now to FIGS. 44–49, a display system 180 in accordance with another alternative preferred embodiment of the present invention is shown. The display system 180 includes a base 182 and a support column 184. Secured to the support column 184 is a lower support arm 186 and a telescoping upper support arm 188. Attached to each support arm is a mounting assembly 190, which preferably comprises a ball joint such as that described herein. Secured to each mounting assembly 190 is a LCD panel 192.

Figure 45:
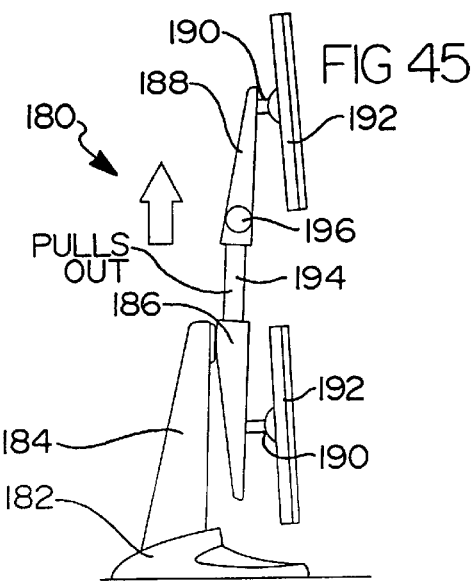
FIG. 45 is a side elevational view of the display system of FIG. 44 showing the upper support arm in an extended position.
Figure 46:
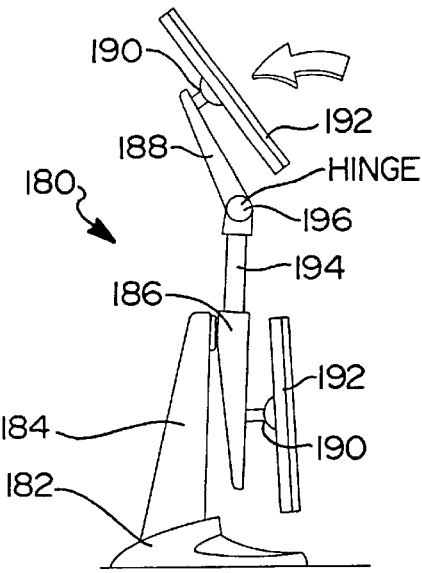
FIG. 46 is a side elevational view of the display system with the upper LCD panel adjusted at an angle relative to the lower LCD panel.
Figure 47:
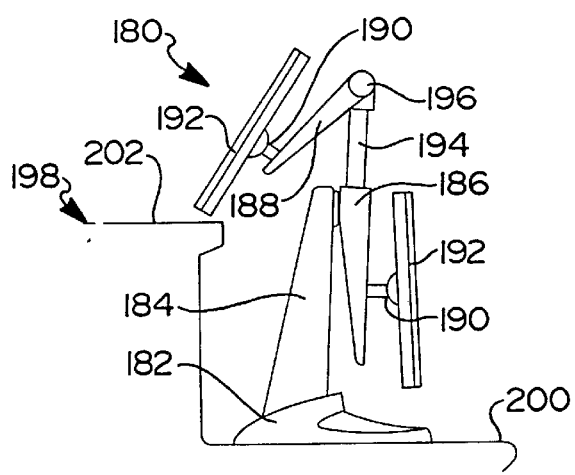
FIG. 47 is a side elevational view of the display system with the upper LCD panel folded over backward relative to the lower LCD panel.

With specific reference to FIGS. 45–47, the lower support arm 186 comprises a tubular construction and the upper support arm 188 comprises a neck portion 194 which enables the upper support arm 188 to be extended (i.e., telescoped) relative to the lower support arm 186. The upper support arm 188 further includes a hinge 196 which enables the upper LCD panel 192 to be angled relative to the neck portion 194 so as to place it at a convenient viewing angle. As is apparent in FIG. 47, the upper LCD panel 192 can even be rotated into position to face away from the lower LCD panel 192. This orientation is particularly well suited for retail applications where a sales person needs to view information while inputting product or other information, and where it is desirable to display to the customer various items of information as the transaction is conducted. Advantageously, the telescoping upper support arm 188 and the hinge 196 enable the two LCD panels 192 to be placed at separate heights to accommodate airline ticket counters, hotel registration counters and other like structures where an employee's counter is frequently at a different height from a surface or counter useable by a customer.

Figure 48:
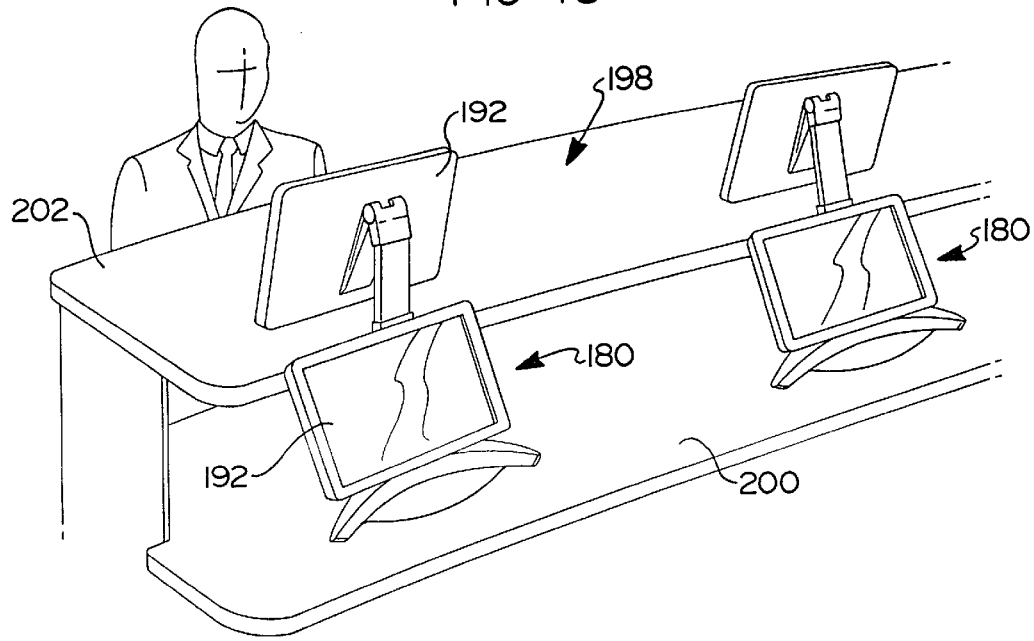
FIG. 48 is a perspective view of the display system in use at an airline ticket counter.

FIGS. 47 and 48 illustrate the display system 180 in use at an ailine ticket counter 198 having a first counter 200 at a lower height than a second counter 202. In this application it will be appreciated that suitable software will be required to "flip" the image displayed on the upper LCD panel 192. The telescoping upper support arm 188 inherently provides a degree of adjustability to accommodate a range of counter heights without modification to the either of the support arms 186,188 or the support column 184.

Figure 49:
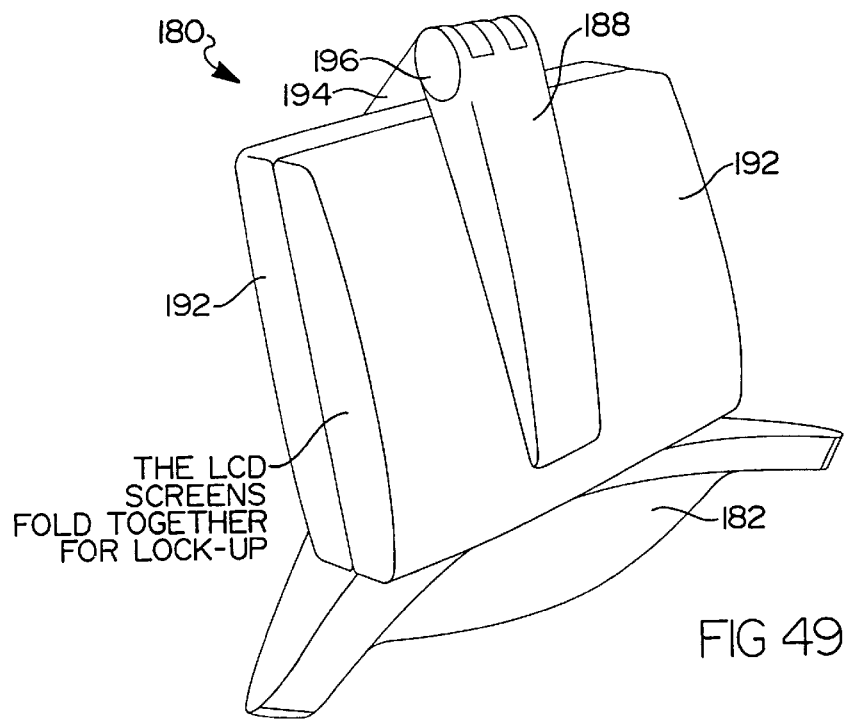
FIG. 49 is a perspective view of the display system in a folded orientation for easy handling.

FIG. 49 illustrates the two LCD panels 192 folded together such that the display system 180 forms a compact assembly which may be easily transported if needed. In this regard it will be appreciated that any form of conventional clasp may be included to secure the folded LCD panels 192 to one another or to the base. Also, a handle could easily be attached to a portion of the display system 180, such as the support column 184, to enable the system 180 to be easily transported.

Referring now to FIGS. 50 and 51, still another display system 200 is shown. With specific reference to FIG. 50, the display system 200 includes a support column 202 and an upper support member 204 having a neck portion 206. The support column 202 includes a bore 208 adapted to receive the neck portion and enable the neck portion 206 to rotate or swivel therein such that the upper support member 204 can be swiveled. The support member 204 is secured to a rear surface 212 of a LCD panel 210 through either a fixed arrangement or a pivotable mounting arrangement such as disclosed herein. The neck 206 may be captured by any suitable arrangement in the bore 208 such that the LCD panel 210 is not removable from the support column 202. Alternatively, it may be releasably disposed in the bore 208 such that the entire upper support member 204 and LCD panel 210 may be lifted out of the column 202 before repositioning the LCD panel 210 as desired. In this manner the clearance between the LCD panel 210 and the support column 202, which would otherwise be important for allowing the support member 204 to freely rotate with the LCD panel 210 thereon, will not be a concern.

With specific reference to FIG. 51, the display system 200 is shown with the upper LCD panel 210 rotated to a position perpendicular to a lower LCD panel 212. The support column 202 is supported on a base 214. In FIG. 52 the upper LCD panel 210 is rotated 180 degrees from the lower LCD panel 212 to permit two individuals facing each other to each view one of the LCD panels 210,212.

Figure 53:
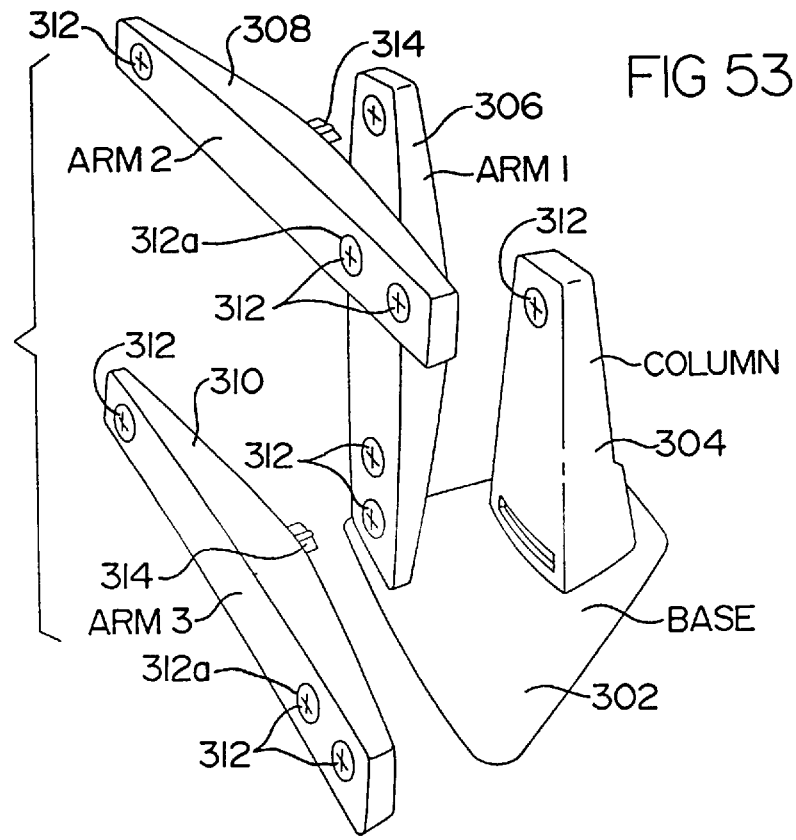
FIG. 53 is an exploded perspective view of a modular, multi-panel LCD display system in accordance with another alternative preferred embodiment of the present invention.

Referring now to FIG. 53, a modular display system 300 is shown in accordance with another alternative preferred embodiment of the present invention. The display system 300 is intended to support anywhere from one to four independent LCD display panels, but it will be appreciated that the system 300 could easily be expanded to support more than four LCD panels if needed, as will be explained momentarily.

Referring to FIG. 53, the system 300 includes a base 302, a support column 304, a first support arm 306, a second support arm 308 and a third support arm 310. Each support arm 306, 308 and 310 includes at least two coupling assemblies 312, and preferably three such assemblies 312. The support column 304 also includes once such assembly 312, although this member could also include several assemblies 312 if needed. Support arms 306, 308 and 310 each also include a mounting member 314 (with the mounting member of support arm 306 being hidden in FIG. 53) which is disposed preferably at an approximate mid-point along a length of its support arm. Each mounting member 314 is adapted to engage in either one of two positions 90 degrees offset from one another in one of the coupling assemblies 312 in a key-like fashion to hold its associated LCD panel in either a portrait orientation or a landscape orientation.

Figure 55:
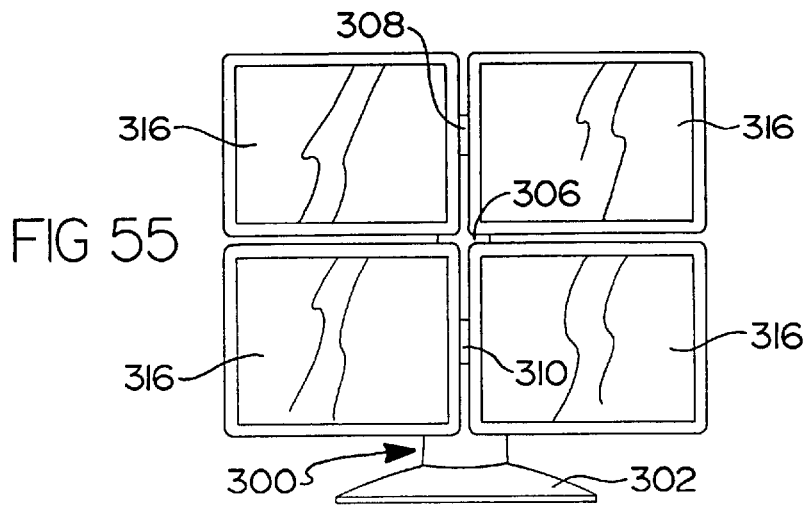
FIG. 55 is a front view of the display system of FIG. 54 with four LCD panels attached thereto.
Figure 56:
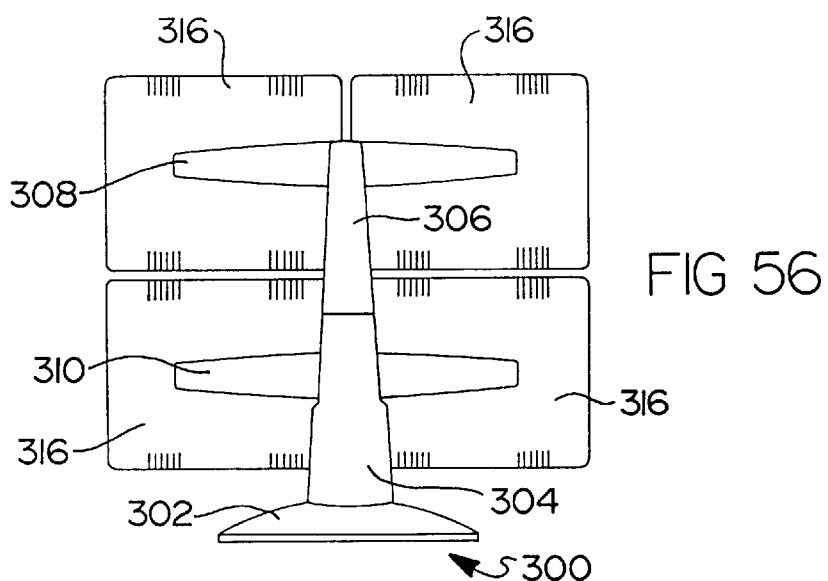
FIG. 56 is a rear view of the display system of FIG. 55.
Figure 57:
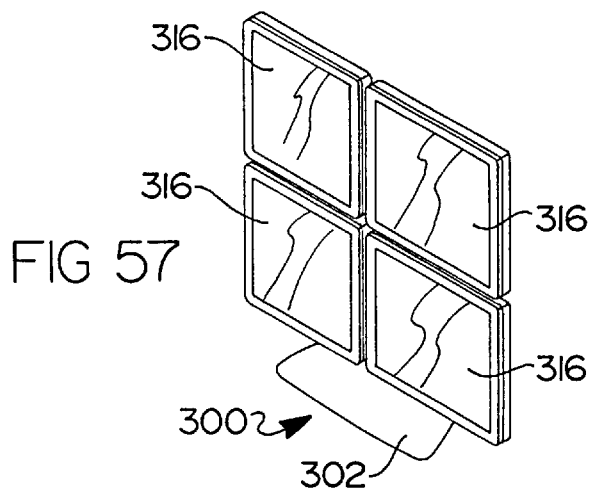
FIG. 57 is a perspective view of the display system of FIG. 55.

The pair of coupling assemblies closely adjacent each other on each support arms 308 and 310 are provided to space two adjacently positioned LCD panels mounted on each arm slightly farther apart from each other to provide additional clearance needed when the two LCD panels are placed in a landscape orientation. Thus, in a landscape orientation, the two LCD panels supported on either of the arms 308 and/or 310 will be supported at the two outermost coupling assemblies 312 near the very ends of each arm. In a portrait orientation the LCD panels will need to be spaced closer to each other, thus requiring one of the LCD panels to be coupled to the more inwardly positioned assembly 312a (FIG. 53) of each support arm 308 and 310. The closely positioned pair of coupling assemblies 312 on support arm 306 enables the third support arm 310 to be mounted in one of two positions on arm 306 depending upon whether the LCD panels are disposed in a landscape or a portrait orientation. FIGS. 55–57 illustrate four LCD panels 316 supported on the display system 300. It will be appreciated that each of the LCD panels 316 includes a mounting member identical or similar to members 314 on a rear housing surface thereof such that each can be quickly and easily coupled to one of the coupling assemblies 312.

Figure 54:
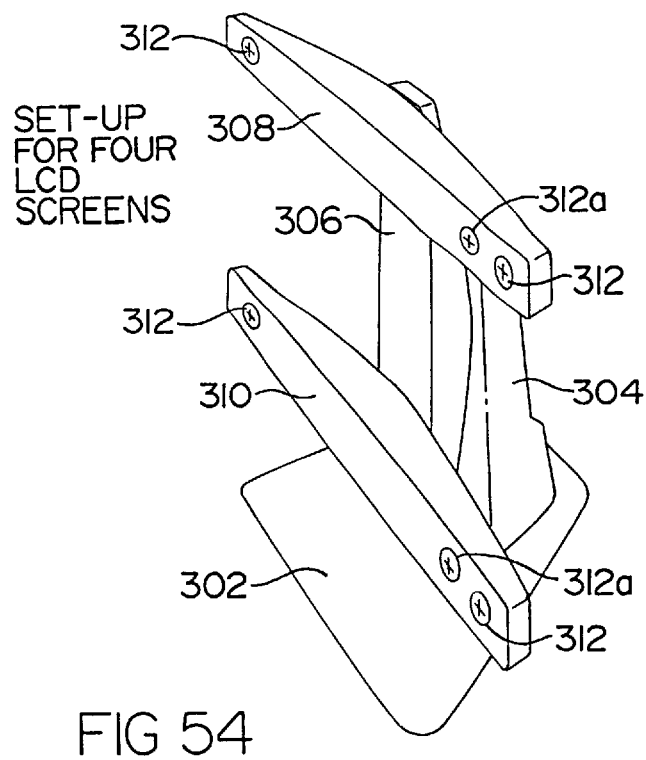
FIG. 54 is a perspective view of the display system shown in FIG. 53 in assembled form ready to accept four LCD panels.
Figure 58:
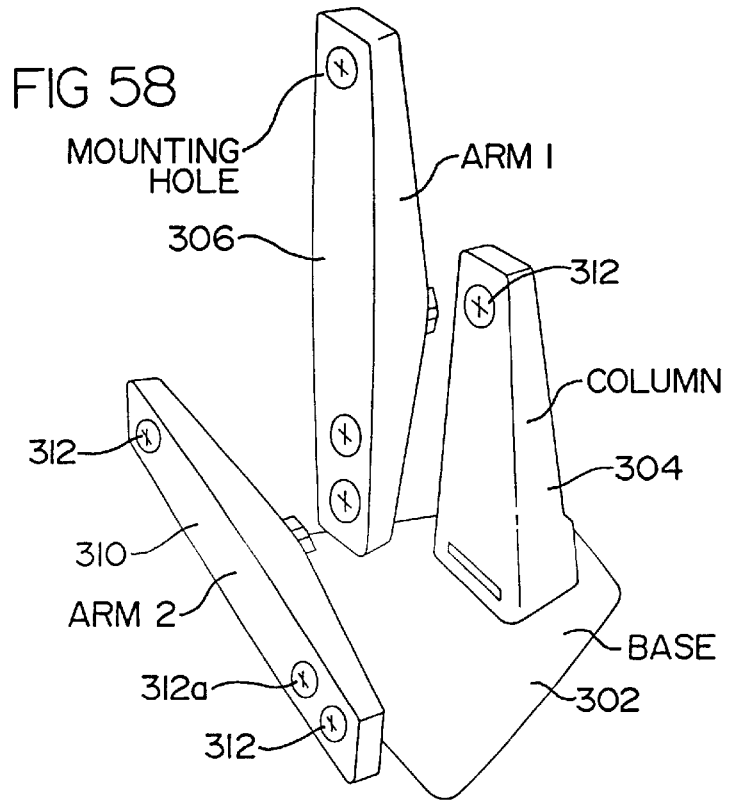
FIG. 58 is an exploded perspective view of the system shown in FIG. 53 but without one of the support arms such that a three LCD panel display system is formed.
Figure 59:
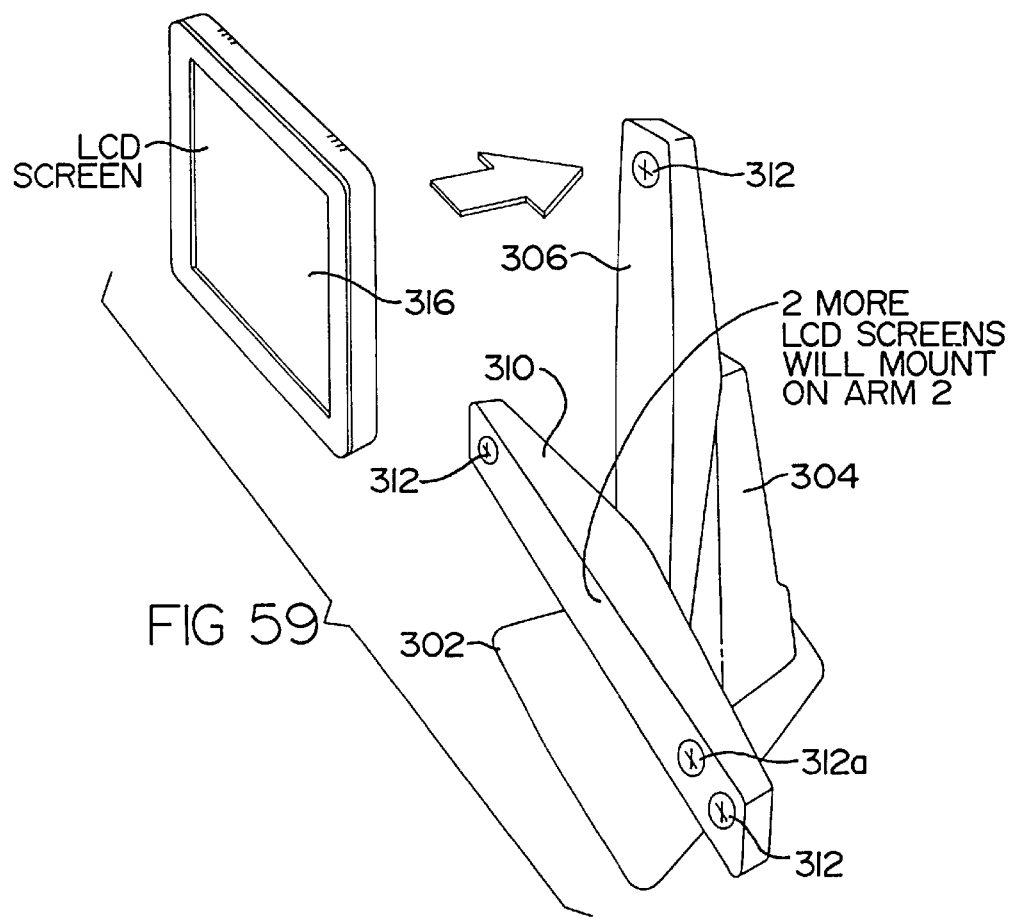
FIG. 59 is an exploded perspective view of the display system shown in FIG. 58 illustrating how a single LCD panel is attached at an uppermost end of one of the support arms.
Figure 60:
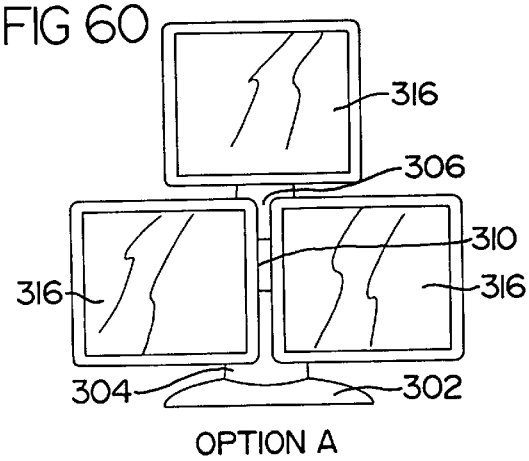
FIG. 60 is a front elevational view of three LCD panels supported on the display system shown in FIG. 59.
Figure 61:
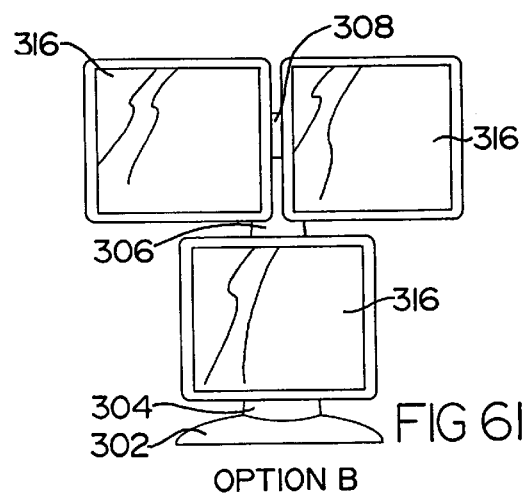
FIG. 61 is a front elevational view of three LCD panels being supported such that the single LCD panel is below an upper pair of LCD panels.
Figure 62:
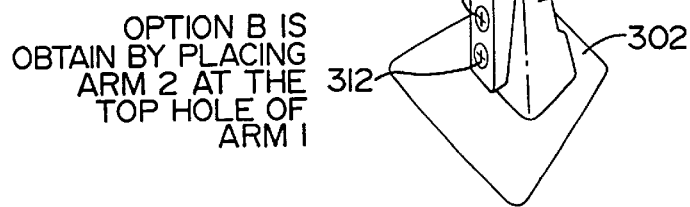
FIG. 62 is a perspective view of a base assembly for supporting three LCD panels in the configuration shown in FIG. 62.

It will be appreciated that the display system 300 could easily be used to support less than four LCD panels 316 if desired. For example, in the drawing of FIG. 54 the second support arm 308 could be eliminated and the one LCD panel 316 coupled directly to the vertically uppermost coupling assembly 312. This arrangement is illustrated in FIGS. 58–60. Alternatively, the lower support arm 310 could be eliminated and a LCD panel 316 coupled directly thereto as illustrated in FIGS. 61 and 62.

Figure 63:
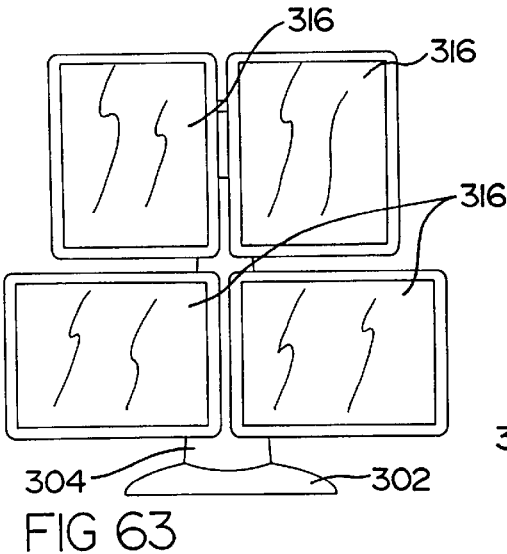
FIG. 63 is a front elevational view of a four LCD panel system with two of the panels disposed in portrait orientation and two disposed in landscape orientation.
Figure 64:
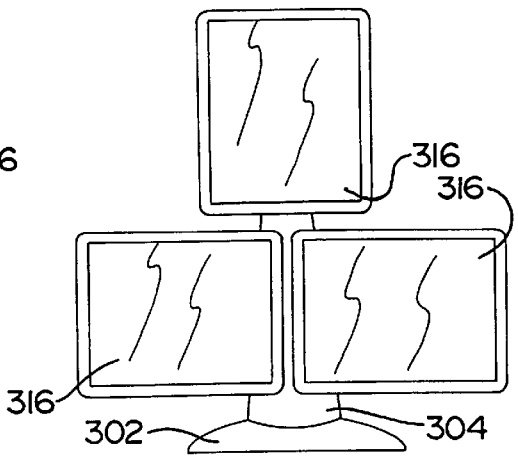
FIG. 64 is a front elevational view of a three LCD panel system with two LCD panels disposed in a landscape orientation and one in a portrait orientation.

It will be appreciated that the display system 300 could be easily modified through the use of additional support arms to support more than four LCD panels 316 if needed. For example, the support arm 306 could be lengthened sufficiently to extend above the second arm 308, and a fourth support arm identical to arms 308 and 310 could be coupled perpendicularly thereto such that two extra LCD panels could be supported. An even longer support member and still another extra support arm could be incorporated to support eight LCD panels 316. As can be appreciated, a very large plurality of independent LCD panels can be supported from a single base 302 and support column 304 if needed. Particularly desirable is the feature of being able to orientate the LCD panels 316 in either portrait or landscape mode, or a combination of each, as needed. FIGS. 63 and 64 illustrate variations of the above described display systems incorporating both landscape and portrait orientated LCD panels 316.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A modular display system comprising:

a base assembly;

a first support arm, operably coupled to said base assembly;

a second support arm secured to said first support arm and having at least a pair of coupling assemblies for securing to portions of first and second liquid crystal display (LCD) panels;

a third support arm secured to said first support arm and having at least one coupling assembly for supporting a third LCD panel on said third support arm; and wherein said third support arm may be readily detached from said first support arm to enable said display system to be modularly configured as either a two panel LCD display system or as a three panel or greater LCD display system.

2. The display system of claim 1, wherein said second support arm includes three said coupling assemblies enabling said first and second LCD panels to be supported adjacent one another in either a portrait positions or landscape positions, while minimizing a spacing between said first and second LCD panels.

3. The display system of claim 1, wherein said third support arm includes a air of said coupling assemblies enabling said third LCD panel, and a fourth LCD panel, to be supported thereon.

4. The display system of claim 3, wherein said third support arm includes three of said coupling assemblies enabling said third and fourth LCD panels to be supported in either a portrait or a landscape orientation while minimizing a spacing between said third and fourth LCD panels in either one of said orientations.

* * * * *